United States Patent
Yasuda

(10) Patent No.: US 10,789,679 B2
(45) Date of Patent: Sep. 29, 2020

(54) IMAGE PROCESSING METHOD, IMAGE PROCESSOR, IMAGE CAPTURING DEVICE, AND IMAGE CAPTURING METHOD FOR GENERATING OMNIFOCAL IMAGE

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 19 days.

(21) Appl. No.: 16/313,805

(22) PCT Filed: May 30, 2017

(86) PCT No.: PCT/JP2017/020066
§ 371 (c)(1),
(2) Date: Dec. 27, 2018

(87) PCT Pub. No.: WO2018/012130
PCT Pub. Date: Jan. 18, 2018

(65) Prior Publication Data
US 2020/0013146 A1    Jan. 9, 2020

(30) Foreign Application Priority Data

Jul. 13, 2016   (JP) ................................. 2016-138163
Sep. 16, 2016   (JP) ................................. 2016-181225

(51) Int. Cl.
*G06T 3/40*      (2006.01)
*G02B 21/36*     (2006.01)
(Continued)

(52) U.S. Cl.
CPC .......... *G06T 3/4053* (2013.01); *G02B 21/362* (2013.01); *G02B 21/367* (2013.01);
(Continued)

(58) Field of Classification Search
CPC ................. G06T 3/4053; G06T 7/0012; G06T 2207/20208; G06T 2207/10148;
(Continued)

(56) References Cited

U.S. PATENT DOCUMENTS

2005/0100245 A1*  5/2005  Chen ........................ G02B 7/34
                                                            382/294
2010/0079626 A1   4/2010  Hatakeyama
(Continued)

FOREIGN PATENT DOCUMENTS

CN        102053358 A     5/2011
CN        103384998 A     11/2013
(Continued)

OTHER PUBLICATIONS

Extended European Search Report issued in corresponding European Patent Application No. 17827263.9-1210, dated Aug. 26, 2019.
(Continued)

*Primary Examiner* — Gevell V Selby
(74) *Attorney, Agent, or Firm* — McDermott Will & Emery LLP

(57) ABSTRACT

A plurality of captured images is first acquired by capturing images of an object while changing a focal position along an optical axis. Then, variations in magnification among the captured images are acquired. On the basis of the variations in magnification, corresponding pixels in the captured images are specified, and definition is compared among the corresponding pixels. Then, an image reference value indicating the number of a captured image that is to be referenced as the luminance value of each coordinates in an omnifocal image is determined on the basis of the result of comparison of the definition. The omnifocal image is thereafter generated by referencing the luminance value in the
(Continued)

captured image indicated by the image reference value for each coordinates. In this way, the omnifocal image that reflects the position and size of the object accurately can be generated.

31 Claims, 22 Drawing Sheets

(51) Int. Cl.
    *G06T 5/00*     (2006.01)
    *G06T 7/00*     (2017.01)
    *H04N 5/232*     (2006.01)
    *G02B 21/06*     (2006.01)

(52) U.S. Cl.
    CPC .............. *G06T 5/003* (2013.01); *G06T 5/008* (2013.01); *G06T 7/0012* (2013.01); *H04N 5/23296* (2013.01); *G02B 21/06* (2013.01); *G06T 2207/10016* (2013.01); *G06T 2207/10148* (2013.01); *G06T 2207/20208* (2013.01); *G06T 2207/30024* (2013.01)

(58) Field of Classification Search
    CPC ............ G06T 5/50; G06T 2207/30072; H04N 5/23296; H04N 5/232; G02B 21/367; G02B 21/362; G02B 21/06; G02B 21/36; G03B 15/00
See application file for complete search history.

(56) References Cited

U.S. PATENT DOCUMENTS

| | | | |
|---|---|---|---|
| 2010/0149363 A1* | 6/2010 | Inomata | G02B 21/367 348/222.1 |
| 2011/0102572 A1 | 5/2011 | Kihara et al. | |
| 2013/0016192 A1 | 1/2013 | Shibata | |
| 2013/0342753 A1 | 12/2013 | Kitagawa et al. | |
| 2015/0326772 A1 | 11/2015 | Kazami | |
| 2016/0006938 A1* | 1/2016 | Haruki | H04N 5/23293 348/208.3 |
| 2016/0029619 A1* | 2/2016 | Sun | A01N 1/0252 435/374 |
| 2016/0191784 A1 | 6/2016 | Murayama et al. | |
| 2019/0025213 A1* | 1/2019 | Abe | G01N 21/6458 |

FOREIGN PATENT DOCUMENTS

| | | |
|---|---|---|
| EP | 1 533 751 A1 | 5/2005 |
| JP | 2011-007872 | 1/2011 |
| JP | 2015-216485 A | 12/2015 |
| JP | 2016-14974 A | 1/2016 |
| WO | 2015/020038 A1 | 2/2015 |

OTHER PUBLICATIONS

International Search Report dated Aug. 8, 2017, issued in corresponding International Application No. PCT/JP2017/020066, with English translation.
Chinese Office Action issued in corresponding Chinese Patent Application No. 201780040590.2, dated Apr. 15, 2020, with English Translation.

* cited by examiner

IMAGE PROCESSING METHOD, IMAGE PROCESSOR, IMAGE CAPTURING DEVICE, AND IMAGE CAPTURING METHOD FOR GENERATING OMNIFOCAL IMAGE

CROSS REFERENCE

This application is the U.S. National Phase under 35 U.S.C. § 371 of International Application No. PCT/JP2017/020066, filed on May 30, 2017, which claims the benefit of Japanese Application No. 2016-138163, filed on Jul. 13, 2016 and Japanese Application No. 2016-181225, filed Sep. 16, 2016, the entire contents of each are hereby incorporated by reference.

TECHNICAL FIELD

The present invention relates to an image processing method, an image processor, an image capturing device, and an image capturing method for generating an omnifocal image on the basis of a plurality of captured images.

BACKGROUND ART

Patent Literature 1 discloses a device for observing the culture conditions of biological cells by capturing images of the cells at high resolutions. The device according to Patent Literature 1 captures images of cells held along with a culture solution in a container with a camera. Such a device may in some cases has difficulty in focusing on all cells in the culture solution in one image capture. Thus, the device captures images a plurality of times while changing the focal position of the camera and combines a plurality of obtained images to generate an omnifocal image that focuses on all the cells.

Patent Literature 2 discloses a conventional technique for generating an omnifocal image. With the device according to Patent Literature 2, the magnifications of images change with a change in the focal position of a camera because the optical system from specimens to image capturing means is non-telecentric. Thus, the device according to Patent Literature 2 corrects and unifies the magnifications of images and then generates an omnifocal image (see, for example, FIG. 2 of Patent Literature 2). The magnifications are corrected on the basis of pre-saved design information about an enlarging optical system and positional information about specimens (see, for example, paragraph 0054 of Patent Literature 2).

CITATION LIST

Patent Literature

Patent Literature 1: Japanese Patent Application Laid-Open No. 2016-14974
Patent Literature 2: Japanese Patent Application Laid-Open No. 2011-7872

SUMMARY OF INVENTION

Technical Problem

In the case of capturing images of cells in a culture solution as in the device according to Patent Literature 1, a concave meniscus is formed in the surface of the culture solution by surface tension. Thus, light is refracted at the surface of the culture solution. As a result, the magnification of each image (the width of the field of view) varies depending the focal position of the camera. Therefore, such variations in magnification among images obtained by a plurality of image captures need to be taken into consideration when generating an omnifocal image.

For example, it is conceivable to generate an omnifocal image by correcting the magnification of each image, as in Patent Literature 2, in accordance with the amount of variations in magnification among images obtained by a plurality of image captures. However, there is the problem that the size of each cell or the intervals of a plurality of cells in each image can change if the magnification of the image is corrected.

In particular, in the case where a plurality of omnifocal images obtained with different fields of view is combined to generate one resultant image, the positions and sizes of cells need to be matched between adjacent omnifocal images. However, if the magnification of each image is corrected as described above, the positions and sizes of cells do not match with high accuracy between adjacent omnifocal images. This causes an image disturbance at the boundaries of the omnifocal images in the resultant image.

Also, the meniscus affects differently depending on various conditions such as the shape of the container, the type of the culture solution, elapsed time, and culture environments. Thus, it is not possible to correct the magnifications of images on the basis of information prepared in advance as in Patent Literature 2.

The present invention has been made in view of such circumstances, and it is an object of the present invention to provide an image processing method, an image processor, an image capturing device, and an image capturing method that can generate an omnifocal image with high accuracy even if the magnifications of images vary depending on the focal position of a camera.

Solution to Problem

In order to solve the problems described above, a first invention of the present application is an image processing method for generating an omnifocal image on the basis of a plurality of captured images. The method includes the steps of a) acquiring a plurality of captured images by capturing an image of an object while changing a focal position along an optical axis, b) acquiring variations in magnification among the plurality of captured images, c) specifying corresponding pixels in the plurality of captured images and comparing definition among the corresponding pixels on the basis of the variations in magnification, d) determining an image reference value on the basis of a comparison result obtained in the step c), the image reference value being a number of one of the captured images that is to be referenced as a luminance value of each coordinates in an omnifocal image, and e) generating an omnifocal image by referencing the luminance value in the captured image indicated by the image reference value for each coordinates.

A second invention of the present application is an image processor for generating an omnifocal image on the basis of a plurality of captured images. The image processor includes an image storage that stores a plurality of captured images by capturing an image of an object while changing a focal position along an optical axis, a magnification variation acquisition part that acquires variations in magnification among the plurality of captured images, an image reference value determination part that specifies corresponding pixels in the plurality of captured images and compares definition among the corresponding pixels on the basis of the variations in magnification to determine an image reference value that is a number of one of the captured images that is to be referenced as a luminance value of each coordinates in an omnifocal image, and an omnifocal image generator that generates an omnifocal image by referencing the luminance value in the captured image indicated by the image reference value for each coordinates.

A third invention of the present application is an image capturing device for capturing an image of an object to generate an omnifocal image. The image capturing device includes a camera that captures an image of the object, a projector that emits light toward the object, a moving mechanism that changes a focal position of the camera along an optical axis, and a controller that controls the camera, the projector, and the moving mechanism and processes an image acquired by the camera. The controller executes the steps of a) acquiring a plurality of captured images by causing the camera to capture an image while causing the moving mechanism to change the focal position, b) calculating variations in magnification among the plurality of captured images, c) performing reciprocal correction of the variations in magnification for each of the plurality of captured images, and d) generating an omnifocal image by using the plurality of captured images having undergone the reciprocal correction.

A fourth invention of the present application is an image capturing method for capturing an image of an object to generate an omnifocal image. The image capturing method includes the steps of a) acquiring a plurality of captured images by capturing an image of the object with a camera while changing a focal position of the camera along an optical axis, b) calculating variations in magnification among the plurality of captured images, c) performing reciprocal correction of the variations in magnification for each of the plurality of captured images, and d) generating an omnifocal image by using the plurality of captured images having undergone the reciprocal correction.

Advantageous Effects of Invention

According to the present invention, an omnifocal image can be generated with high accuracy.

DESCRIPTION OF EMBODIMENTS

Preferred embodiments of the present invention will be described hereinafter with reference to the drawings.

1. Embodiment 1

1.1. Configuration of Image Capturing Device

Figure 1:
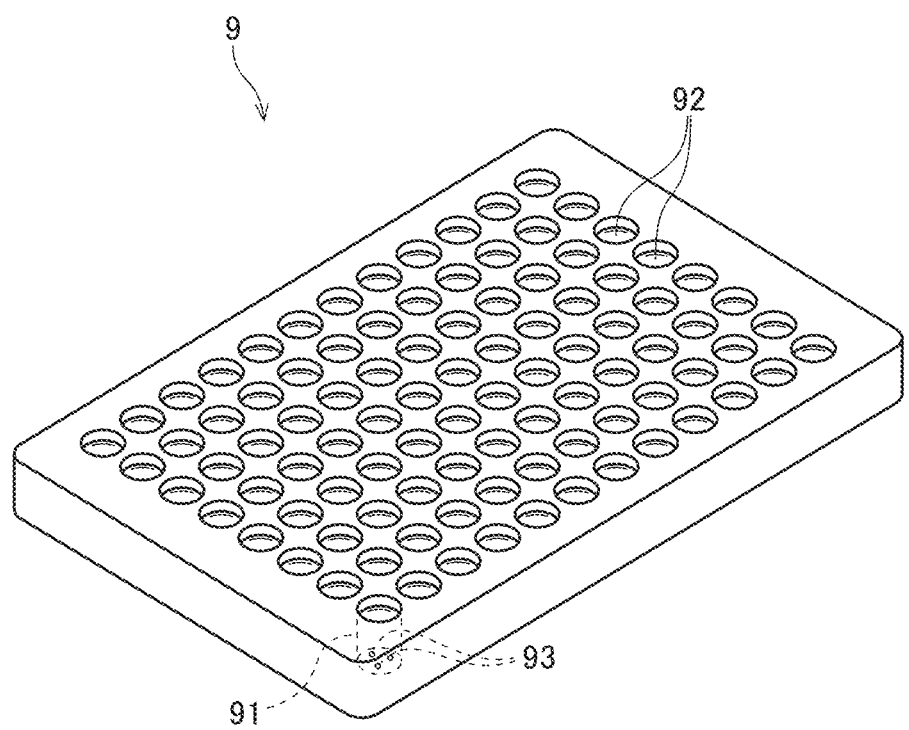
FIG. 1 is a perspective view illustrating an example of a well plate that is set in an image capturing device.

FIG. 1 is a perspective view illustrating an example of a well plate 9 that is set in an image capturing device 1. The well plate 9 is a generally plate-like specimen container having a plurality of wells (depressions) 91. The material for the well plate 9 is, for example, a transparent resin that transmits light. As illustrated in FIG. 1, the plurality of wells 91 is arranged regularly in the upper surface of the well plate 9. Each well 91 holds therein a plurality of biological cells 93 targeted for image capture, along with a culture solution 92. Note that the shape of the wells 91 when viewed from above may be circular as in FIG. 1 or may be other shapes such as rectangles.

Figure 2:
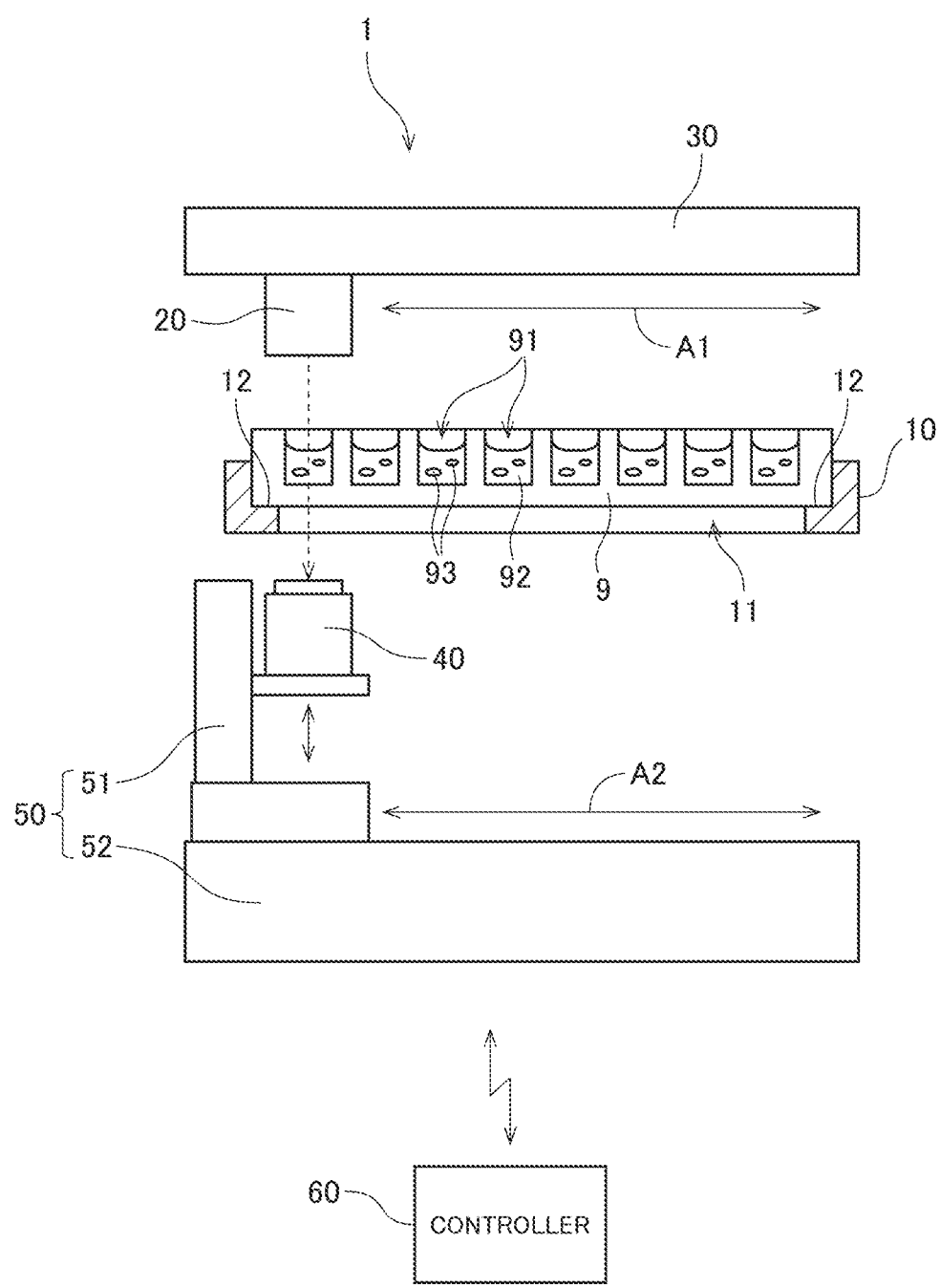
FIG. 2 illustrates a configuration of an image capturing device according to an embodiment of the invention.

FIG. 2 illustrates a configuration of the image capturing device 1 according to an embodiment of the invention. This image capturing device 1 is a device that captures images of the plurality of cells 93 in the well plate 9 a plurality of times while changing the focal position of a camera 40 and combines a plurality of resultant captured images to generate a composite image (omnifocal image) for observation that focuses on all the cells 93 and has less blurring.

The image capturing device 1 is used in, for example, a screening process of narrowing down chemical compounds serving as candidates for pharmaceuticals in the field of research and development of pharmaceuticals. In the screening process, a person in charge adds chemical compounds of different concentrations or compositions to the plurality of wells 91 of the well plate 9. Then, the image capturing device 1 is used to capture images of cells 93 in each well 91 of the well plate 9. The culture conditions of the cells 93 are thereafter compared and analyzed on the basis of the obtained images to verify the effects of the chemical compounds added to the culture solution 92.

Alternatively, the image capturing device 1 may be used in research and development of pluripotent stem cells such as IPS cells or ES cells to observe cell differentiation, for example.

As illustrated in FIG. 2, the image capturing device 1 according to the present embodiment includes a stage 10, a projector 20, a projector moving mechanism 30, the camera 40, a camera moving mechanism 50, and a controller 60.

The stage 10 is a pedestal that holds the well plate 9. The position of the stage 10 in the image capturing device 1 is fixed during at least image capture. The stage 10 has a rectangular opening 11 penetrating in the up-down direction in the center. The stage 10 also has a ring-shaped supporting surface 12 at the edge of the opening 11. The well plate 9 is fitted in the opening 11 and supported in a horizontal position by the supporting surface 12. The top and bottom of each well 91 are thus exposed without being blocked off by the stage 10.

The projector 20 is disposed above the well plate 9 held on the stage 10. The projector 20 has a light source such as LEDs. The light source of the projector 20 emits light during image capture, which will be described later. Thus, the projector 20 applies light downward. Note that the projector 20 needs only apply light from the side opposite to the camera 40 toward the well plate 9. Therefore, the light source itself of the projector 20 may be disposed at a position off the top of the well plate 9 and configured to apply light to the well plate 9 via an optical system such as a mirror.

The projector moving mechanism 30 is a mechanism for moving the projector 20 horizontally along the upper surface of the well plate 9 held on the stage 10. For example, a mechanism for converting rotational motion of a motor into rectilinear motion through a ball screw is used as the projector moving mechanism 30. The image capturing device 1 can dispose the projector 20 at a position above each well 91 by operating the projector moving mechanism 30. Although only one direction indicated by arrow A1 is illustrated in FIG. 2 as the direction of movement of the projector 20, the projector moving mechanism 30 may be configured to move the projector 20 in two directions (left-right direction and depth direction in FIG. 2) along the upper surface of the well plate 9.

The camera 40 is disposed below the well plate 9 held on the stage 10. The camera 40 includes an optical system such as a lens and an image sensor such as a CCD or a CMOS. In the case of capturing an image, the camera 40 captures an image of part of the well plate 9 while the projector 20 applies light toward that part of the well plate 9. Accordingly, an image of cells 93 in the well plate 9 is acquired in the form of digital data. The captured image is input from the camera 40 to the controller 60.

The camera moving mechanism 50 is a mechanism for changing the height and horizontal position of the camera 40 while maintaining the posture of the camera 40. As illustrated in FIG. 2, the camera moving mechanism 50 includes an up-and-down movement mechanism 51 and a horizontal movement mechanism 52.

The up-and-down movement mechanism 51 is a mechanism for moving the camera 40 up and down. For example, a mechanism for converting rotational motion of a motor into rectilinear motion through a ball screw is used as the up-and-down movement mechanism 51. The height of the camera 40 is changed by operating the up-and-down movement mechanism 51. This changes the distance between the well plate 9 held on the stage 10 and the camera 40 (i.e., shooting distance between the cells 93 and the camera 40). The camera 40 according to the present embodiment has a fixed focal length. Accordingly, the focal position of the camera 40 moves up and down along the optical axis as the position of the camera 40 moves up and down.

The horizontal movement mechanism 52 is a mechanism for moving the camera 40 and the up-and-down movement mechanism 51 horizontally as an integral unit. For example, a mechanism for converting rotational motion of a motor into rectilinear motion through a ball screw is used as the horizontal movement mechanism 52. The image capturing device 1 can dispose the camera 40 at a position under each well 91 by operating the horizontal movement mechanism 52. Although only one direction indicated by arrow A2 is illustrated in FIG. 2 as the direction of movement of the camera 40 by the horizontal movement mechanism 52, the camera moving mechanism 50 may be configured to move the camera 40 in two directions (left-right direction and depth direction in FIG. 2) along the lower surface of the well plate 9.

Note that the projector moving mechanism 30 and the horizontal movement mechanism 52 described above are driven in synchronization. Accordingly, the projector 20 and the camera 40 are always disposed at the same position when viewed from above. That is, the projector 20 and the camera 40 move the same distance in the same direction, and when the camera 40 is disposed at a position under a given well 91, the projector 20 is always disposed at a position above that well 91.

Figure 3:
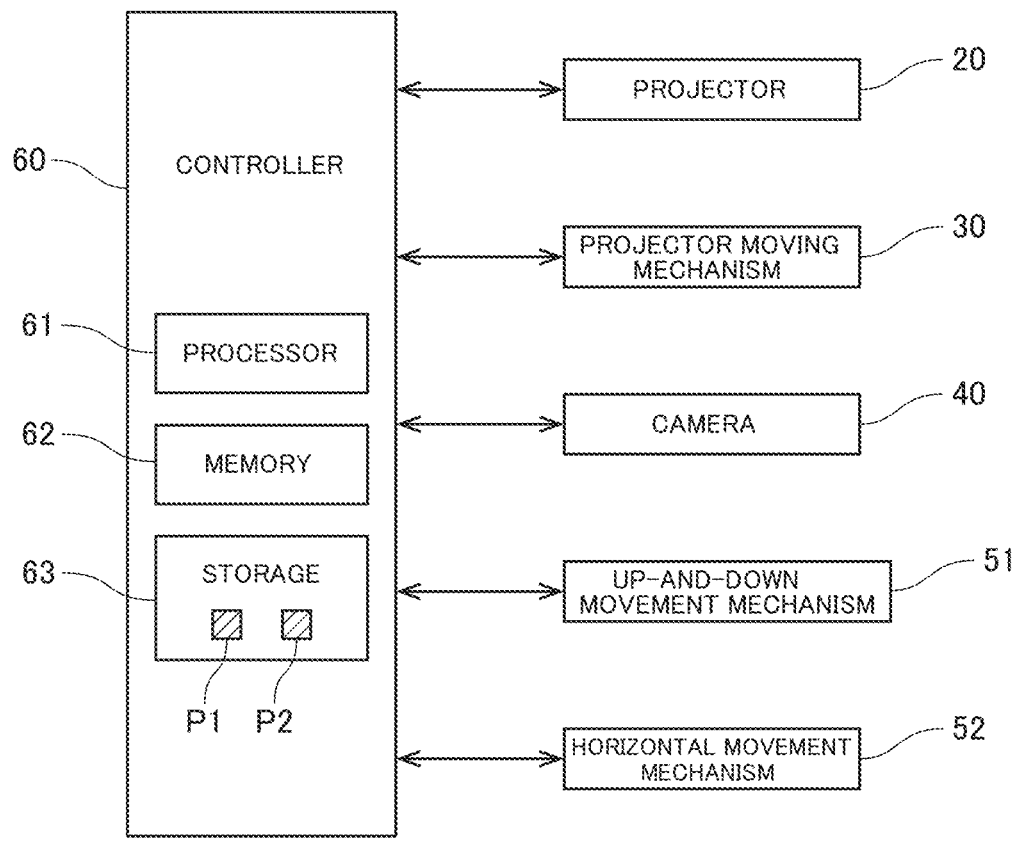
FIG. 3 is a block diagram illustrating connection between a controller and each part of the image capturing device.

The controller 60 is configured by, for example, a computer. The controller 60 has a function of controlling the operation of each part of the image capturing device 1 and a function serving as an image processor for generating an omnifocal image on the basis of a plurality of captured images input from the camera 40. FIG. 3 is a block diagram illustrating connection between the controller 60 and each part of the image capturing device 1. As schematically illustrated in FIG. 3, the controller 60 includes a processor 61 such as a CPU, a memory 62 such as a RAM, and a storage 63 such as a hard disk drive. The storage 63 stores a control program P1 for controlling the operation of each part of the image capturing device 1, and an image processing program P2 for generating an omnifocal image on the basis of captured images input from the camera 40.

As illustrated in FIG. 3, the controller 60 is communicably connected to each of the projector 20, the projector moving mechanism 30, the camera 40, the up-and-down movement mechanism 51, and the horizontal movement mechanism 52 described above. The controller 60 controls the operations of the above-described parts in accordance with the control program P1, thereby causing the processing for capturing images of cells 93 held in each well 91 of the well plate 9 to proceed. The controller 60 also generates an omnifocal image by processing captured images input from the camera 40 in accordance with the image processing program P2.

1.2. Image Capturing Process

Figure 4:
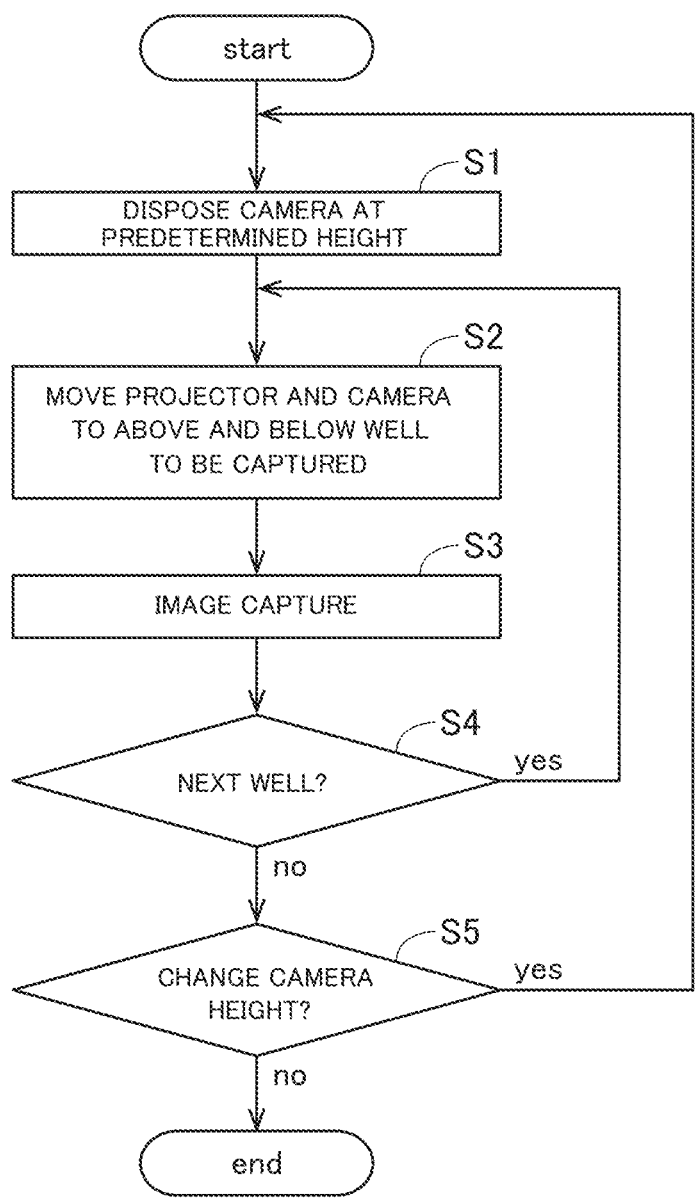
FIG. 4 is a flowchart illustrating a flow of an image capturing process performed by the image capturing device.
Figure 5:
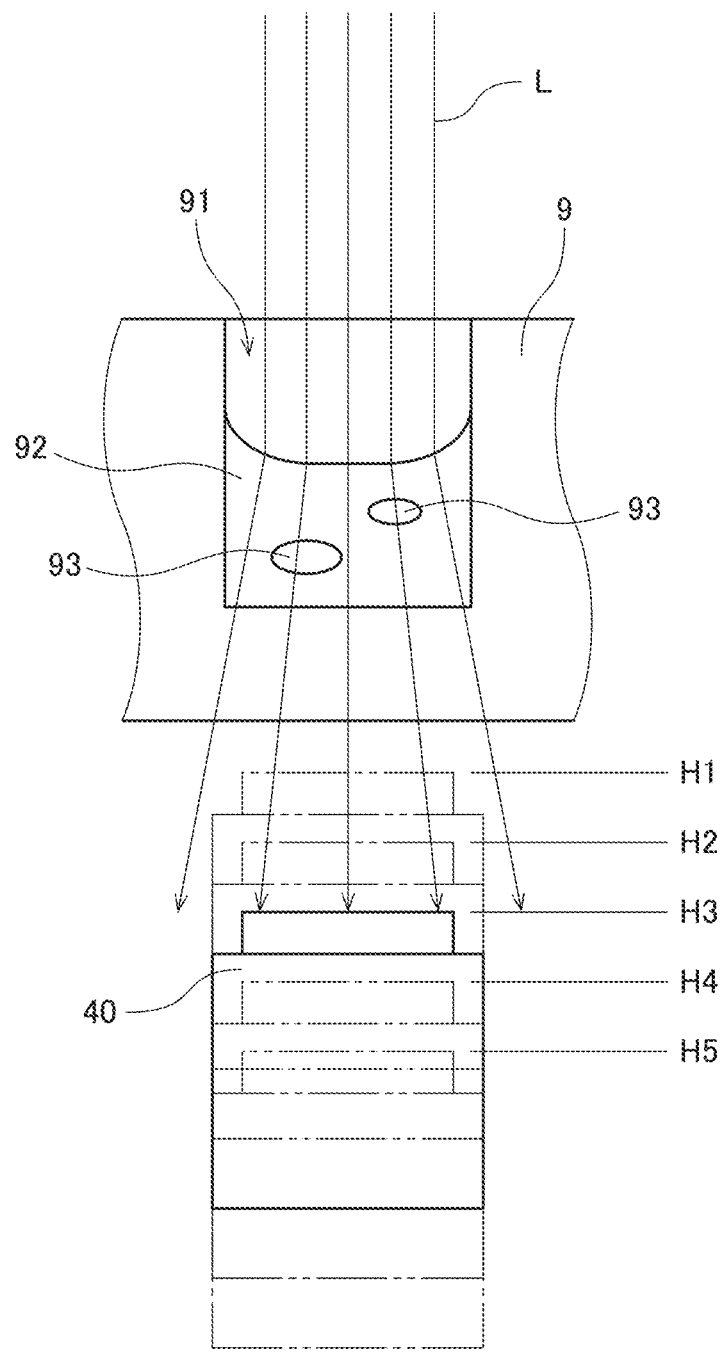
FIG. 5 illustrates the image capturing process performed for one well.

Next, the operations of the aforementioned image capturing device 1 will be described. FIG. 4 is a flowchart illustrating a flow of the image capturing process performed by the image capturing device 1. FIG. 5 illustrates the image capturing process performed for one well 91.

When the well plate 9 has been set on the stage 10 of the image capturing device 1 and an instruction to start operation has been input to the controller 60, the controller 60 first operates the up-and-down movement mechanism 51. Thereby, the camera 40 is disposed at a predetermined height (step S1). According to the present embodiment, the height of the camera 40 can be changed in five stages (from a first height H1 to a fifth height H5) as illustrated in FIG. 5. At the start of the image capturing process, the camera 40 is first disposed at the highest first height H1.

Next, the controller 60 operates the projector moving mechanism 30 and the horizontal movement mechanism 52. Thereby, the projector 20 and the camera 40 are respectively moved to above and below a well 91 targeted for image capture (step S2). Then, the controller 60 captures an image of cells 93 held in that well 91 by operating the projector 20 and the camera 40 (step S3). That is, the camera 40 captures an image while the projector 20 applies light L downward. Accordingly, an image of the cells 93 held in that well 91 is captured from the first height H1.

Then, the controller 60 determines whether or not there is the next well 91 targeted for image capture (step S4). If there is the next well 91 (yes in step S4), the controller 60 operates the projector moving mechanism 30 and the horizontal movement mechanism 52. Thereby, the projector 20 and the camera 40 are respectively moved to above and below the next well 91 (step S2). Then, the controller 60 captures an image of cells 93 held in that well 91 by operating the projector 20 and the camera 40 (step S3).

In this way, the controller 60 repeats the movement of the projector 20 and the camera 40 (step S2) and the image capture (step S3). Accordingly, images of all the wells 91 targeted for image capture in the well plate 9 are captured from the first height H1.

If there remain no wells 91 for which image capture has not yet been performed (no in step S4), the controller 60 determines whether or not to change the height of the camera 40 (step S5). Here, if there remains a height at which image capture has not yet been performed among the five heights H1 to H5 prepared in advance, the controller 60 determines to change the height of the camera 40 (yes in step S5). For example, when the image capturing process at the first height H1 has ended, the controller 60 determines to change the height of the camera 40 to the next height, i.e., the second height H2.

In the case of changing the height of the camera 40, the controller 60 operates the up-and-down movement mechanism 51 so as to move the camera 40 to a height to which the height of the camera 40 ought to be changed (step S1). This changes the focal position of the camera 40. Then, the aforementioned processing in steps S2 to S4 is repeated. Accordingly, an image of cells 93 taken from the changed height is acquired for each well 91 of the well plate 9.

As described above, the controller 60 repeats the change in the height of the camera 40 (step S1) and the acquisition of captured images for the plurality of wells 91 (steps S2 to S4). Accordingly, five images taken from the five heights H1 to H5 are acquired for each of the plurality of wells 91 of the well plate 9.

1.3. Generation of Omnifocal Image

Next, image processing for generating an omnifocal image on the basis of a plurality of captured images input from the camera 40 will be described.

When the aforementioned steps S1 to S5 are completed, five captured images D1 to D5 taken with different shooting distances are obtained for each well 91 of the well plate 9. However, the surface of the culture solution 92 in each well 91 has a concave meniscus formed under the influence of surface tension as illustrated in FIG. 5. Thus, light L emitted from the projector 20 is refracted when passing through the culture solution 92, and becomes diffused light. Therefore, the five captured images D1 to D5 have different magnifications. Also, the magnitude of diffusion of the light L differs for each well 91. Accordingly, the amounts of variations in magnification among the five captured images D1 to D5 also differ for each well 91.

Figure 6:
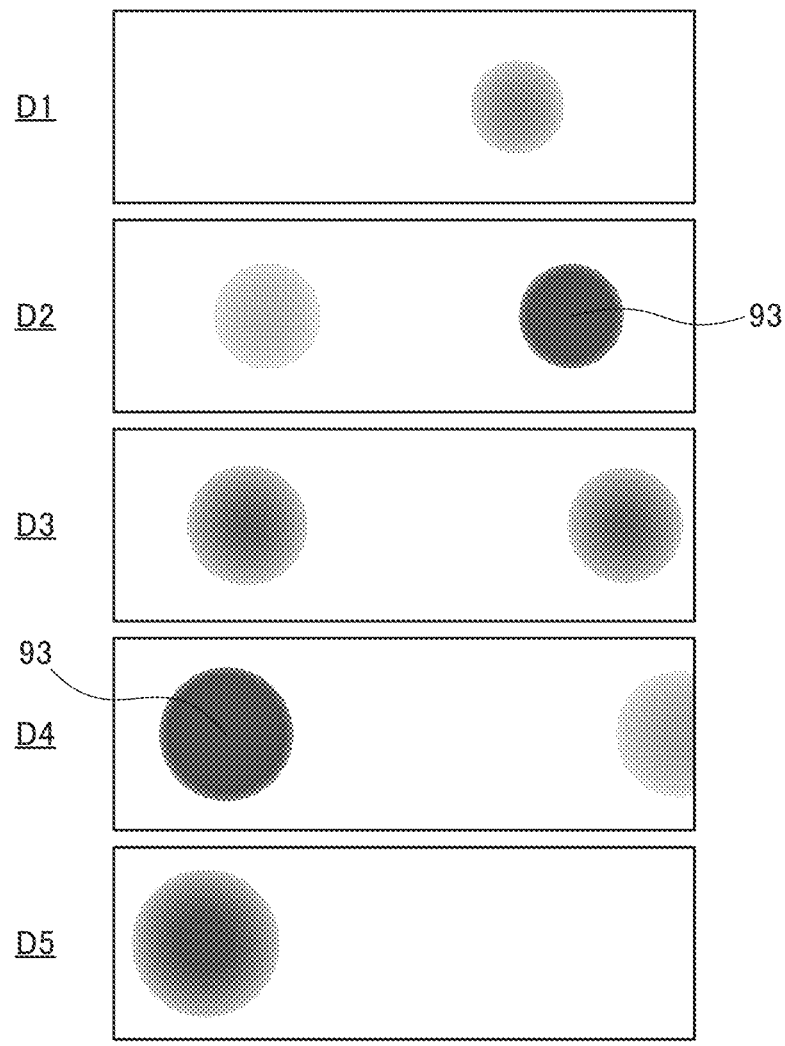
FIG. 6 illustrates an example of five captured images acquired for one well.

FIG. 6 illustrates an example of the five captured images D1 to D5 acquired for one well 91. The captured images D1 to D5 are images taken by the camera 40 disposed at the heights H1 to H5, respectively. Each of the captured images D1 to D5 includes one or two images out of two cells 93 held in the well 91. The cell 93 on the right side in the diagram is most sharply in focus in the captured image D2 taken by the camera 40 disposed at the height H2. The cell 93 on the left side in the diagram is most sharply in focus in the captured image D4 taken by the camera 40 disposed at the height H4.

Figure 7:
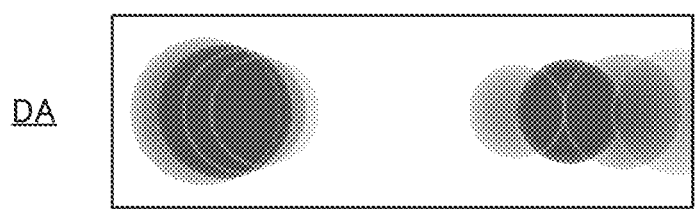
FIG. 7 illustrates an example (comparative example) of an omnifocal image generated by simply combining captured images.

Under the influence of the aforementioned meniscus, the magnifications of the captured images D1 to D5 increase as the height of the camera 40 decreases (i.e., as the shooting distance between the cells 93 and the camera 40 increases). Thus, the captured image D1 has a lowest magnification and the captured image D5 has a highest magnification among the five captured images D1 to D5. Accordingly, if these captured images D1 to D5 are simply combined, blurring around each cell 93 will increase as in an omnifocal image DA in FIG. 7 (comparative example). FIG. 7 illustrates an example (comparative example) of the omnifocal image obtained by simply combining the captured images.

Figure 8:
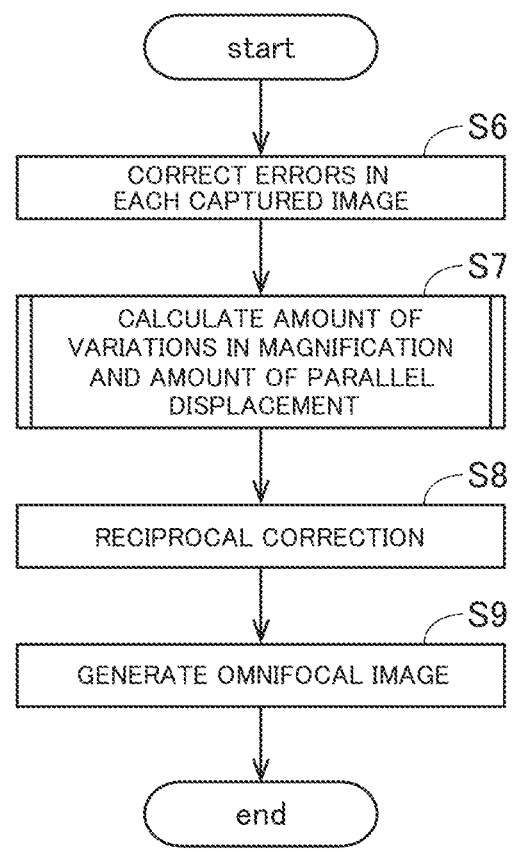
FIG. 8 is a flowchart illustrating a flow of image processing for generating one omnifocal image from the five captured images.

FIG. 8 is a flowchart illustrating a flow of image processing for generating one omnifocal image DA from the five captured images D1 to D5.

When the five captured images D1 to D5 have been obtained, the controller 60 first corrects errors in each of the captured images D1 to D5 (step S6). Here, the controller 60 corrects variations in position among the captured images D1 to D5, the variations being caused by machine errors in the image capturing device 1. For example, if the horizontal movement mechanism 52 has a known positioning error, the positions of the captured images D1 to D5 are each corrected by an amount corresponding to the positioning error. This increases the accuracy of calculation of the amounts of variations in magnification and the amounts of parallel displacement among the five captured images D1 to D5 in the next step S7.

Next, the controller 60 calculates the amounts of variations in magnification and the amounts of parallel displacement among the five captured images D1 to D5 (step S7). Here, the controller 60 detects how much the sizes of the cells 93 or the positions of the cells 93 change among the five captured images D1 to D5. In this way, the magnitude of variations in magnification caused by the meniscus of the culture solution 92 is calculated.

Figure 9:
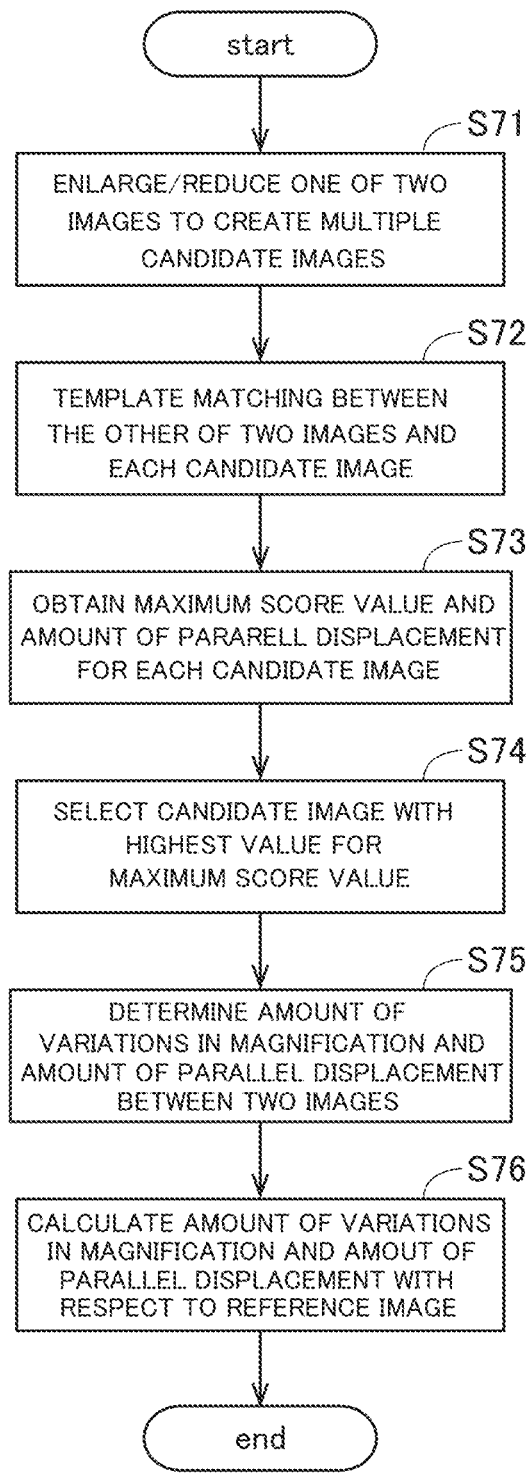
FIG. 9 is a flowchart illustrating an example of processing that is performed in step S7.
Figure 10:
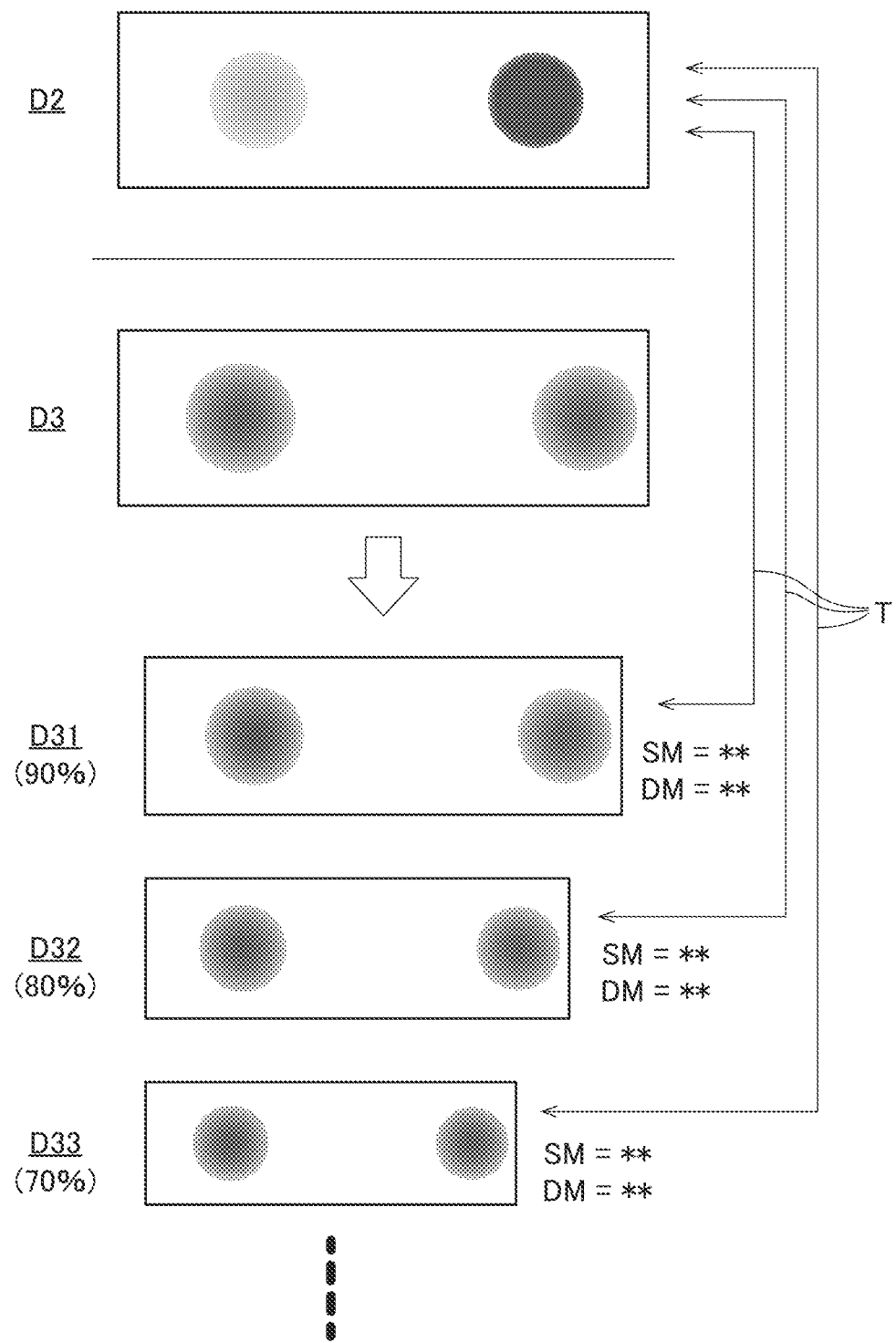
FIG. 10 schematically illustrates processing that is performed to obtain the amount of variations in magnification and the amount of parallel displacement between two captured images.

FIG. 9 is a flowchart illustrating an example of processing that is performed in step S7. According to the present embodiment, the amount of variations in magnification and the amount of parallel displacement are obtained for each pair of adjacent images when the five captured images D1 to D5 are arranged in order of the focal position. FIG. 10 schematically illustrates processing for obtaining the amount of variations in magnification and the amount of parallel displacement for the two captured images D2 and D3.

In step S7, a plurality of candidate images is first created by enlarging or reducing one of the two captured images to each preset magnification (step S71). In the example in FIG. 10, the captured image D3 having a higher magnification (narrower field of view), out of the two captured images D2 and D3, is reduced to each preset magnification in order to create a plurality of candidate images D31, D32, D33, and so on.

Then, template matching is performed between the other of the two captured images and each of the plurality of created candidate images (step S72). In the example in FIG. 10, template matching is performed between the captured image D2 and each of the plurality of candidate images D31, D32, D33, and so on as indicated by arrows T. Specifically, each of the candidate images D31, D32, D33, and so on is displaced parallel relative to the captured image D2. Then, a matching score at each position is calculated. The matching score is, for example, an evaluation value that indicates similarity of the image and that is calculated by a known method such as Sum of Squared Difference (SSD), Sum of Absolute Difference (SAD), Normalized Cross-Correlation (NCC), or Zero-mean Normalized Cross-Correlation (ZNCC).

The controller 60 obtains a maximum value S of the matching score and the amount of parallel displacement M at that time for each of the candidate images D31, D32, D33, and so on (step S73). Then, a candidate image having a highest value for the maximum value S of the matching score is determined as a selected image for the captured image D3 (step S74). When the selected image has been determined, the controller 60 determines the magnification of the selected image as the amount of variations in magnification between the two captured images D2 and D3. Also, the amount of parallel displacement M when the above-described matching score of the selected image becomes the maximum value S is determined as the amount of parallel displacement between the two captured images D2 and D3 (step S75).

The controller 60 executes the above-described processing in steps S71 to S75 for each pair of adjacent images when the five captured images D1 to D5 are arranged in order of the focal position. In this way, the amount of variations in magnification and the amount of parallel displacement are determined for each pair of images.

When the amount of variations in magnification and the amount of parallel displacement between each pair of images have been determined, the controller 60 uses one of the five captured images D1 to D5 (e.g., captured image D1) as a reference image and calculates the amounts of variations in magnification and the amounts of parallel displacement for the other captured images with respect to the reference image (step S76). For example, the amount of variations in magnification for the captured image D3 with respect to the captured image D1 is assumed to be a value obtained by multiplying the amount of variations in magnification between the two captured images D1 and D2 and the amount of variations in magnification between the two captured images D2 and D3. Also, the amount of parallel displacement for the captured image D3 with respect to the captured image D1 is assumed to be a value obtained by adding the amount of parallel displacement between the two captured images D1 and D2 and the amount of parallel displacement between the two captured images D2 and D3 after correcting the amounts of variations in magnification.

Figure 11:
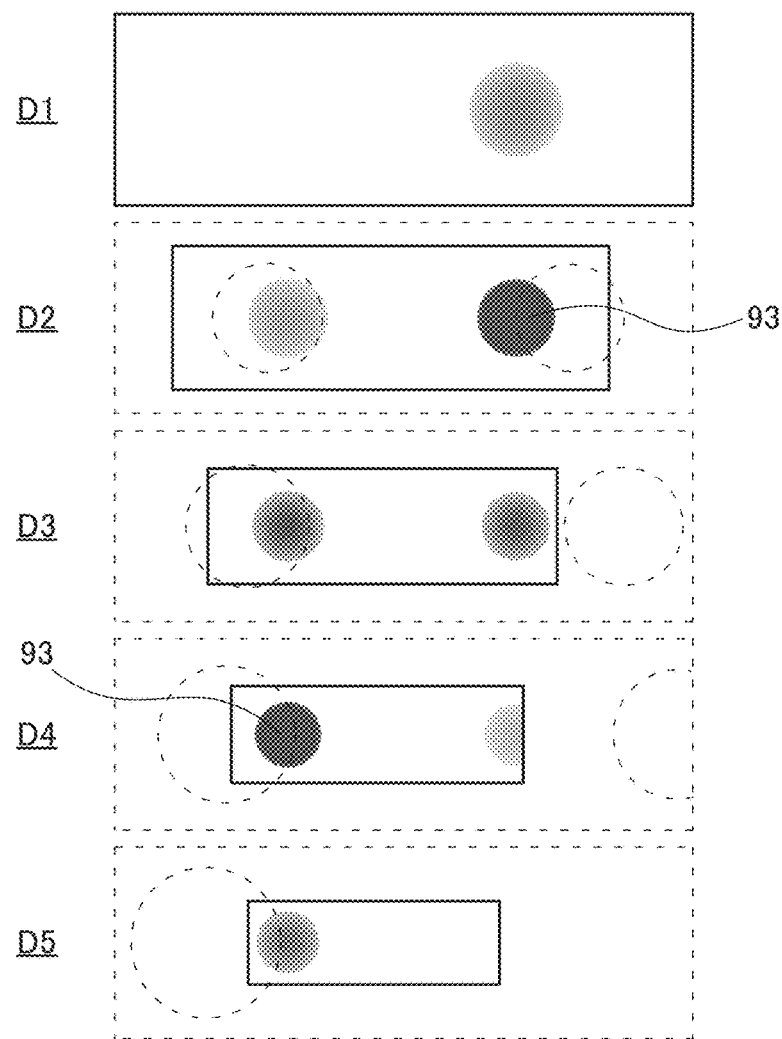
FIG. 11 illustrates an example of five captured images reciprocally corrected.

Refer back to FIG. 8. When the processing in step S7 is completed, next, the controller 60 reciprocally corrects the captured images other than the reference image among the five captured images D1 to D5 on the basis of the amounts of variations in magnification and the amounts of parallel displacement calculated in step S76 (step S8). FIG. 11 illustrates an example of the five captured images D1 to D5 reciprocally corrected. In the example in FIG. 11, the captured image D1 having a lowest magnification is used as a reference, and each of the other four captured images D2 to D5 is reduced on the basis of the amount of variations in magnification and displaced in parallel on the basis of the amount of parallel displacement.

Figure 12:
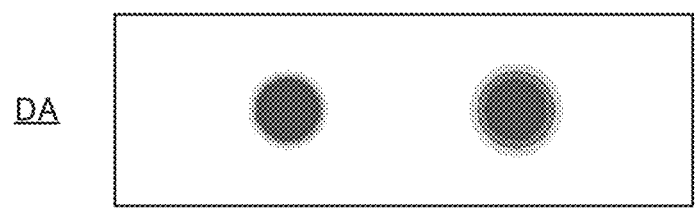
FIG. 12 illustrates an example of an omnifocal image generated by combining the captured images reciprocally corrected.

Thereafter, the controller 60 generates the omnifocal image DA using the reference image and the four captured images reciprocally corrected (step S9). The aforementioned reciprocal correction in step S8 allows the positions of the cells 93 to match among the captured images D1 to D5 as illustrated in FIG. 11. Thus, the omnifocal image DA with less blurring as illustrated in FIG. 12 can be obtained by combining these captured images D1 to D5. FIG. 12 illustrates an example of the omnifocal image obtained by combining the reciprocally corrected captured images.

In particular, this image capturing device 1 calculates the amounts of variations in magnification and the amounts of parallel displacement on the basis of the captured images D1 to D5 input from the camera 40, instead of storing the amounts of variations in magnification and the amounts of parallel displacement in the controller 60 in advance. Thus, even if the amounts of variations in magnification and the amounts of parallel displacement change due to the shape of the meniscus of the culture solution 92, the omnifocal image DA can be generated in consideration of the changed amounts of variations in magnification and the changed amounts of parallel displacement. Accordingly, a high-quality omnifocal image DA can be generated for each well 91 of the well plate 9.

2. Embodiment 2

An image capturing device according to Embodiment 2 will be described hereinafter. Note that description of members that are similar to those in Embodiment 1 is omitted.

2.1. Configuration of Image Capturing Device

Figure 13:
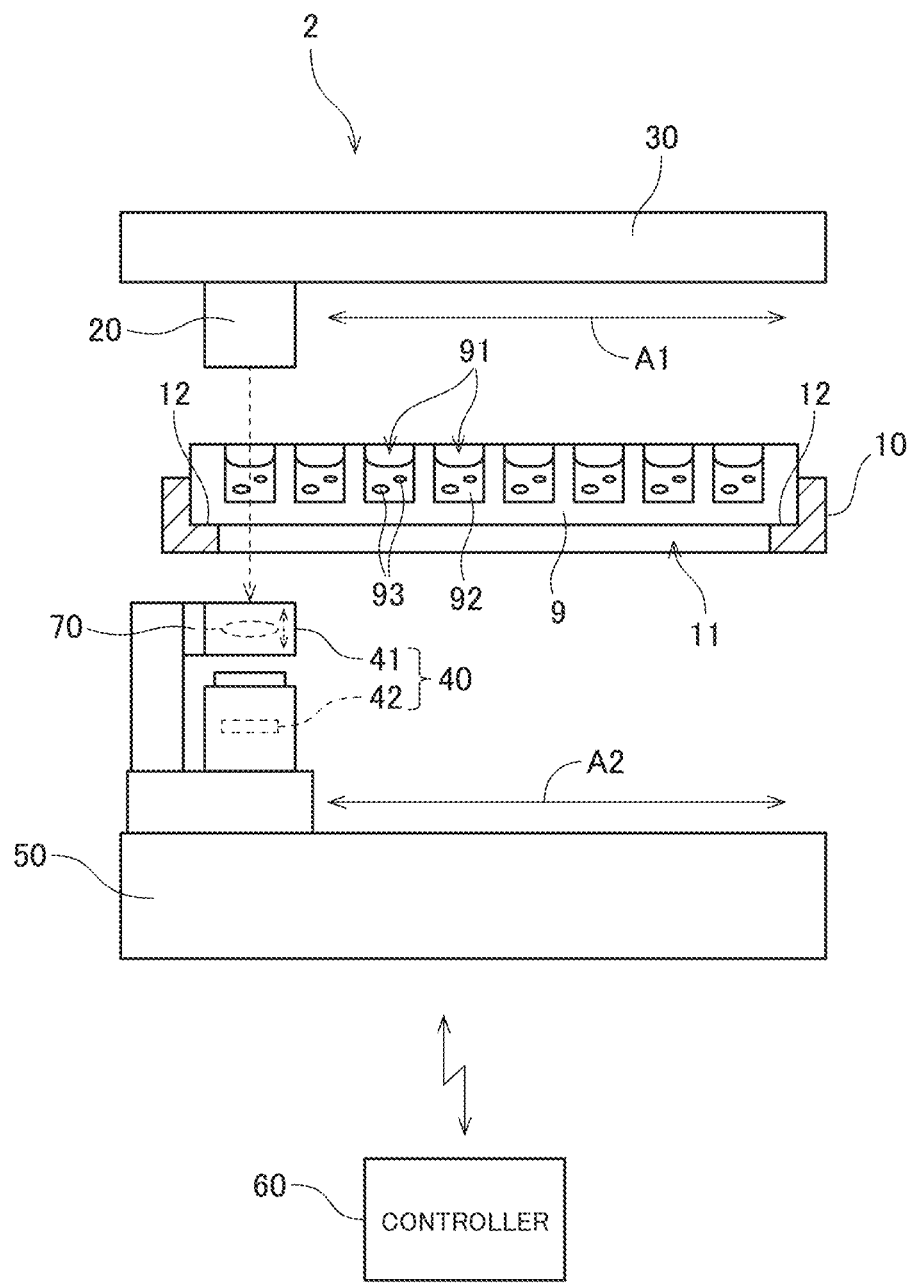
FIG. 13 illustrates a configuration of another image capturing device.

FIG. 13 illustrates a configuration of an image capturing device 2. As illustrated in FIG. 13, the image capturing device 2 according to the present embodiment includes a stage 10, a projector 20, a projector moving mechanism 30, a camera 40, a focal point moving mechanism 70, a camera moving mechanism 50, and a controller 60.

The camera 40 includes an optical system 41 such as a lens and an image sensor 42 such as a CCD or a CMOS.

The focal point moving mechanism 70 is a mechanism for changing the focal position of the camera 40. The focal point moving mechanism 70 according to the present embodiment moves some optics included in the optical system 41 of the camera 40. Thereby, the focal position of the camera 40 is changed along the optical axis. The focal point moving mechanism 70 is capable of changing the focal position of the camera 40 minutely in the up-down direction in the vicinity of the cells 93 in the well plate 9. For example, a compact motor is used as the focal point moving mechanism 70.

The camera moving mechanism 50 is a mechanism for changing the horizontal position of the camera 40 while maintaining the posture of the camera 40. The camera moving mechanism 50 moves the camera 40 and the focal point moving mechanism 70 horizontally as an integral unit. For example, a mechanism for converting rotational motion of a motor into rectilinear motion through a ball screw is used as the camera moving mechanism 50. The image capturing device 2 can dispose the camera 40 at a specified position under a well 91 by operating the camera moving mechanism 50. Although only one direction indicated by arrow A2 is illustrated in FIG. 13 as the direction of movement of the camera 40 by the camera moving mechanism 50, the camera moving mechanism 50 may be configured to move the camera 40 in two directions (left-right direction and depth direction in FIG. 13) along the lower surface of the well plate 9.

The projector moving mechanism 30 and the camera moving mechanism 50 described above are driven in synchronization. Accordingly, the projector 20 and the camera 40 are always disposed at the same position when viewed from above. That is, the projector 20 and the camera 40 move the same distance in the same direction, and when the camera 40 is disposed at a position under a given cell 93, the projector 20 is always disposed at a position above that cell 93.

Figure 14:
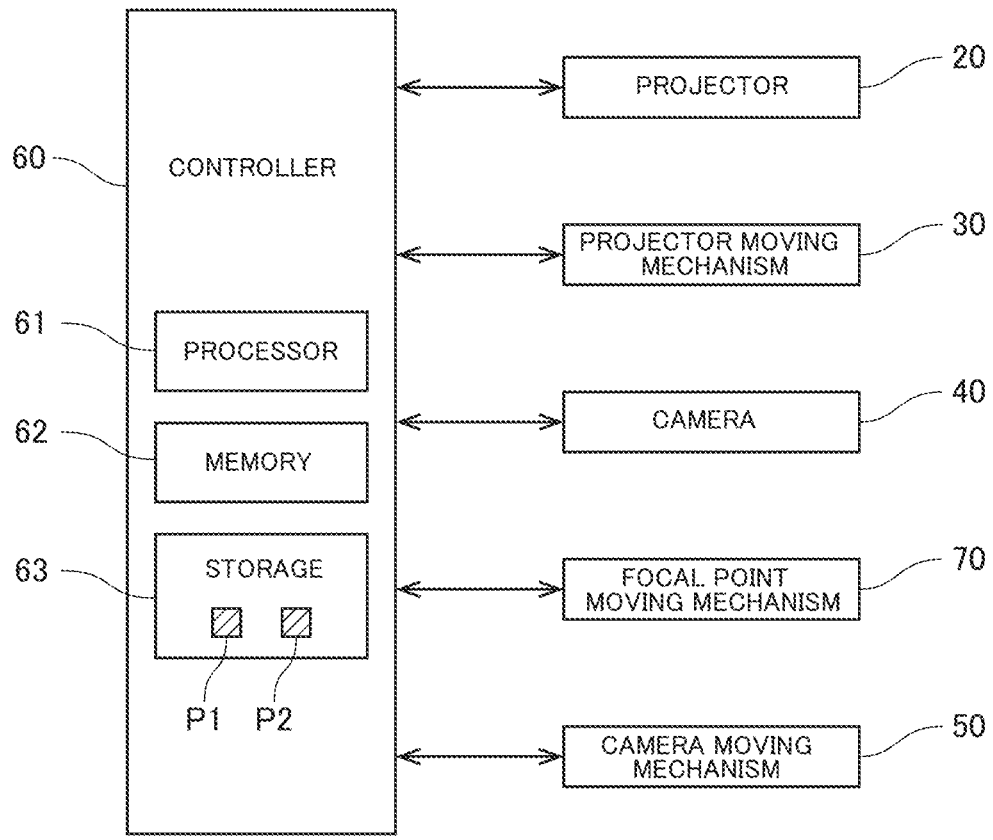
FIG. 14 is a block diagram illustrating connection between a controller and each part of the image capturing device.

The controller 60 is configured by, for example, a computer. The controller 60 has a function serving as a control device for controlling the operation of each part of the image capturing device 2 and a function serving as an image processor for generating an omnifocal image on the basis of a plurality of captured images input from the camera 40. FIG. 14 is a block diagram illustrating connection between the controller 60 and each part of the image capturing device 2. As illustrated in FIG. 14, the controller 60 is communicably connected to each of the projector 20, the projector moving mechanism 30, the camera 40, the focal point moving mechanism 70, and the camera moving mechanism 50 described above.

Figure 15:
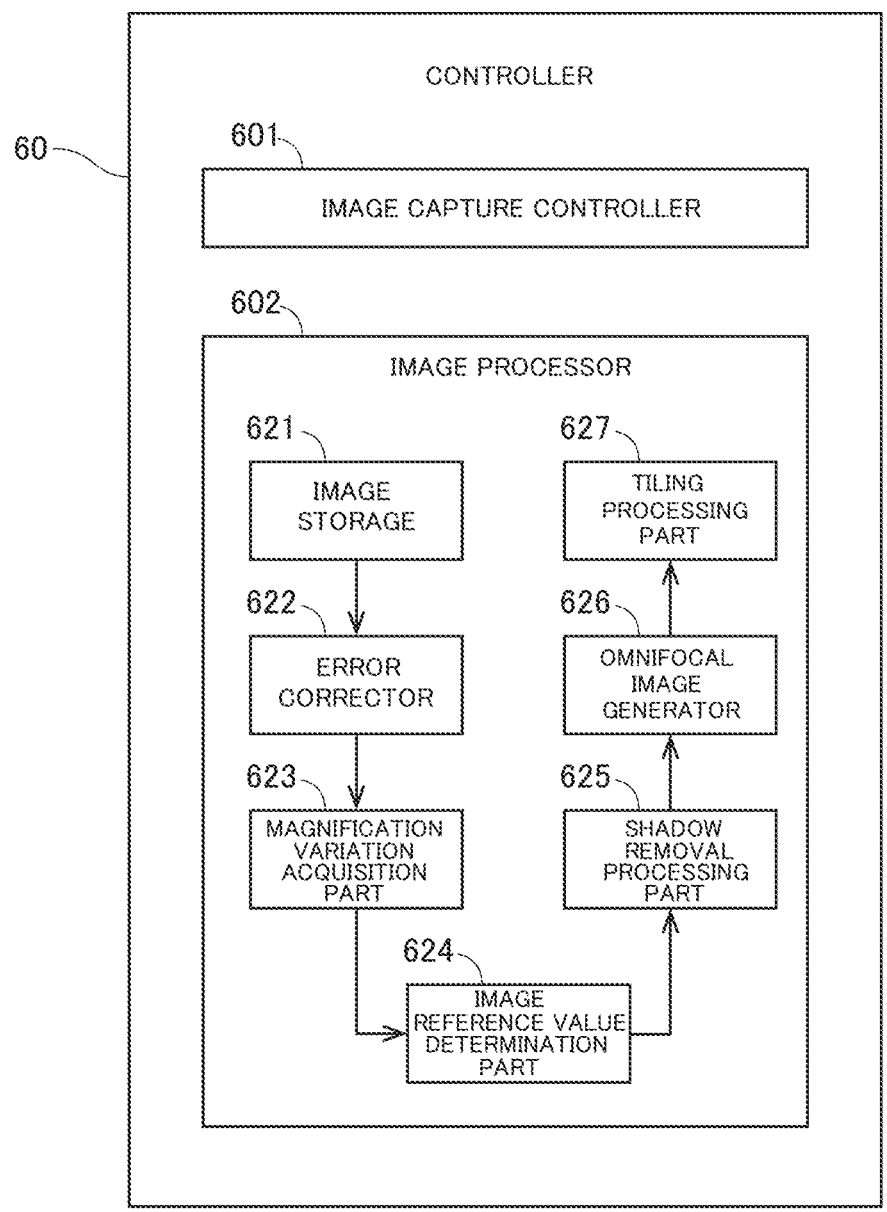
FIG. 15 is a block diagram schematically illustrating functions implemented within the controller.

FIG. 15 is a block diagram schematically illustrating the functions implemented within the controller 60. As illustrated in FIG. 15, the controller 60 includes an image capture controller 601 and an image processing part 602. The image capture controller 601 controls the operations of the projector 20, the projector moving mechanism 30, the camera 40, the focal point moving mechanism 70, and the camera moving mechanism 50 in accordance with a control program P1, thereby causing the processing for capturing images of cells 93 held in each well 91 of the well plate 9 to proceed. The image processing part 602 generates an omnifocal image by processing a plurality of captured images input from the camera 40 in accordance with an image processing program P2.

The image processing part 602 includes an image storage 621, an error corrector 622, a magnification variation acquisition part 623, an image reference value determination part 624, a shadow removal processing part 625, an omnifocal image generator 626, and a tiling processing part 627 as illustrated in FIG. 15. Specific processing performed by these parts will be described later.

2.2. Image Capturing Process

Figure 16:
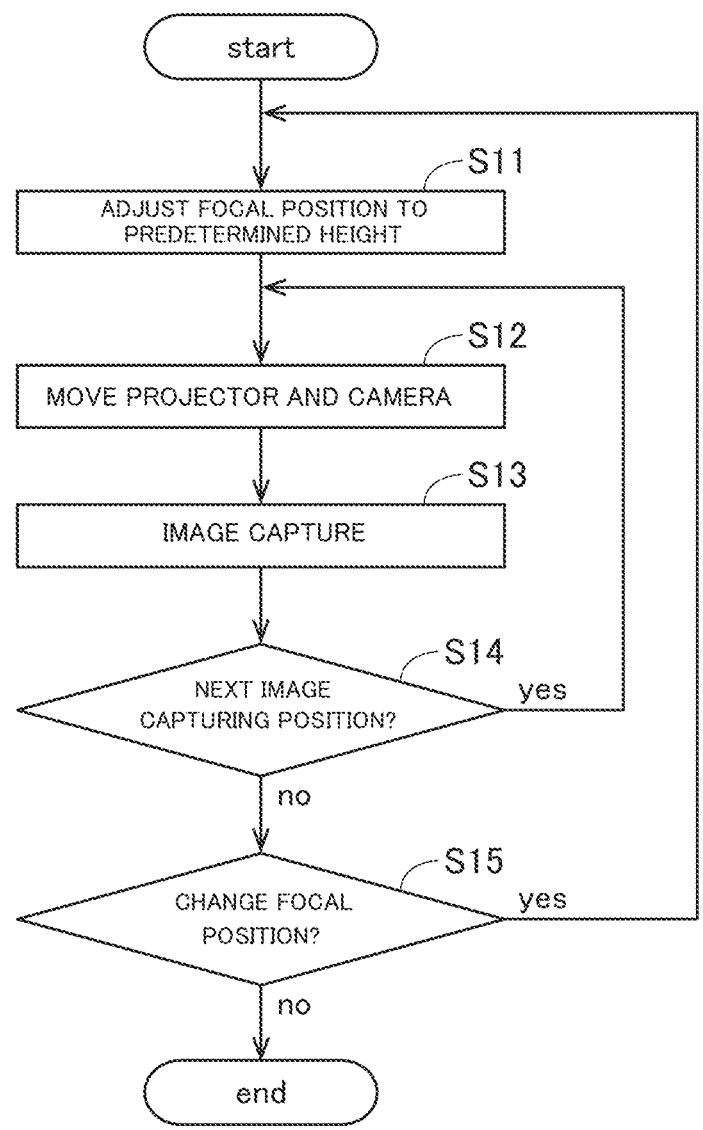
FIG. 16 is a flowchart illustrating a flow of the image capturing process performed by the image capturing device.
Figure 17:
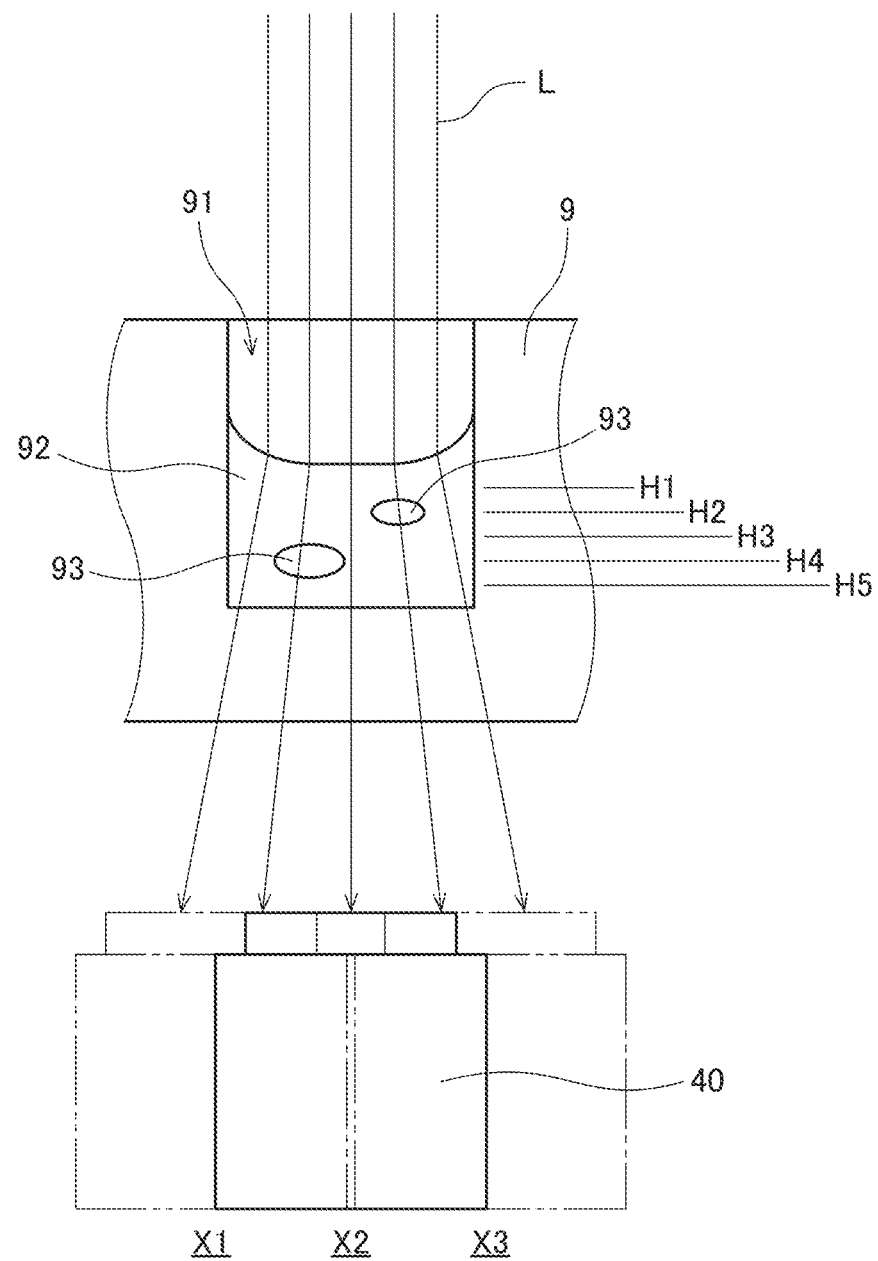
FIG. 17 illustrates the image capturing process performed for one well.

Next, the operations of the aforementioned image capturing device 2 will be described. FIG. 16 is a flowchart illustrating a flow of the image capturing process performed by the image capturing device 2. FIG. 17 illustrates the image capturing process performed for one well 91.

When the well plate 9 has been set on the stage 10 of the image capturing device 2 and an instruction to start operation has been input to the controller 60, the image capture controller 601 of the controller 60 first operates the focal point moving mechanism 70. Thereby, the focal position of the camera 40 is adjusted to a predetermined height (step S11). According to the present embodiment, the focal position of camera 40 can be changed in five stages (from a first focal position H1 to a fifth focal position H5) as illustrated in FIG. 17. At the start of the image capturing process, the focal point of the camera 40 is first adjusted to the highest first focal position H1.

This image capturing device 2 divides one well 91 into a plurality of regions and captures an image of each region. The controller 60 previously stores coordinate information about image capturing positions at which the image of each region is captured. When step S11 has ended, the controller 60 operates the projector moving mechanism 30 and the camera moving mechanism 50 on the basis of this coordinate information. Thereby, the camera 40 is moved to a first image capturing position X1 where a first image capture ought to be performed, and the projector 20 is moved to above the first image capturing position X1 (step S12).

Then, the controller 60 operates the projector 20 and the camera 40 to capture an image from the first image capturing position X1 (step S13). That is, the camera 40 capture an image while the projector 20 applies light downward. Accordingly, an image is captured from the first image capturing position X1 at the first focal position H1.

Then, the controller 60 determines whether or not there is the next image capturing position at which image capture is to be performed (step S14). If there is the next image capturing position (yes in step S14), the controller 60 operates the projector moving mechanism 30 and the camera moving mechanism 50. Thereby, the camera 40 is moved to the next second image capturing position X2, and the projector 20 is moved to above the second image capturing position X2 (step S12). Then, the controller 60 operates the projector 20 and the camera 40 to capture an image from the second image capturing position X2 (step S13).

In this way, the controller 60 repeats the movement of the projector 20 and the camera 40 (step S12) and the image capture (step S13). Accordingly, images are captured from all the preset image capturing positions at the first focal position H1.

If there remain no image capturing positions at which image capture has not yet been performed (no in step S14), the controller 60 determines whether or not to change the focal position of the camera 40 (step S15). Here, if there remains a focal position at which image capture has not yet been performed among the five focal positions H1 to H5, the controller 60 determines to change the focal position of the camera 40 (yes in step S15). For example, when the image capturing process at the first focal position H1 has ended, the controller 60 determines to change the focal position of the camera 40 to the next focal position, i.e., the second focal position H2.

In the case of changing the focal position of the camera 40, the controller 60 operates the focal point moving mechanism 70 to move the focal position of the camera 40 to a position to which the focal position of the cameral 40 ought to be changed (step S11). Then, the aforementioned processing in steps S12 to S14 is repeated. Accordingly, images are captured from all the preset image capturing positions at the changed focal position.

As described above, the controller 60 repeats the change in the focal position of the camera 40 (step S11) and the acquisition of captured images from a plurality of image capturing positions (steps S12 to S14). Accordingly, five images are captured at the five focal positions H1 to H5 for each of the plurality of preset image capturing positions.

2.3. Image Processing

Next, image processing for generating an omnifocal image on the basis of a plurality of captured images input from the camera 40 will be described.

When the aforementioned steps S11 to S15 are completed, five captured images D1 to D5 taken at different focal positions are acquired for each image capturing position. However, the surface of the culture solution 92 in the well 91 has a concave meniscus formed under the influence of surface tension as illustrated in FIG. 17. Thus, light L emitted from the projector 20 is refracted when passing through the surface of the culture solution 92, and becomes diffused light. Therefore, the five captured images D1 to D5 have different magnifications. Also, the magnitude of diffusion of the light L differs for each image capturing position. Accordingly, the amounts of variations in magnification among the five captured images D1 to D5 also differ for each image capturing position.

Figure 18:
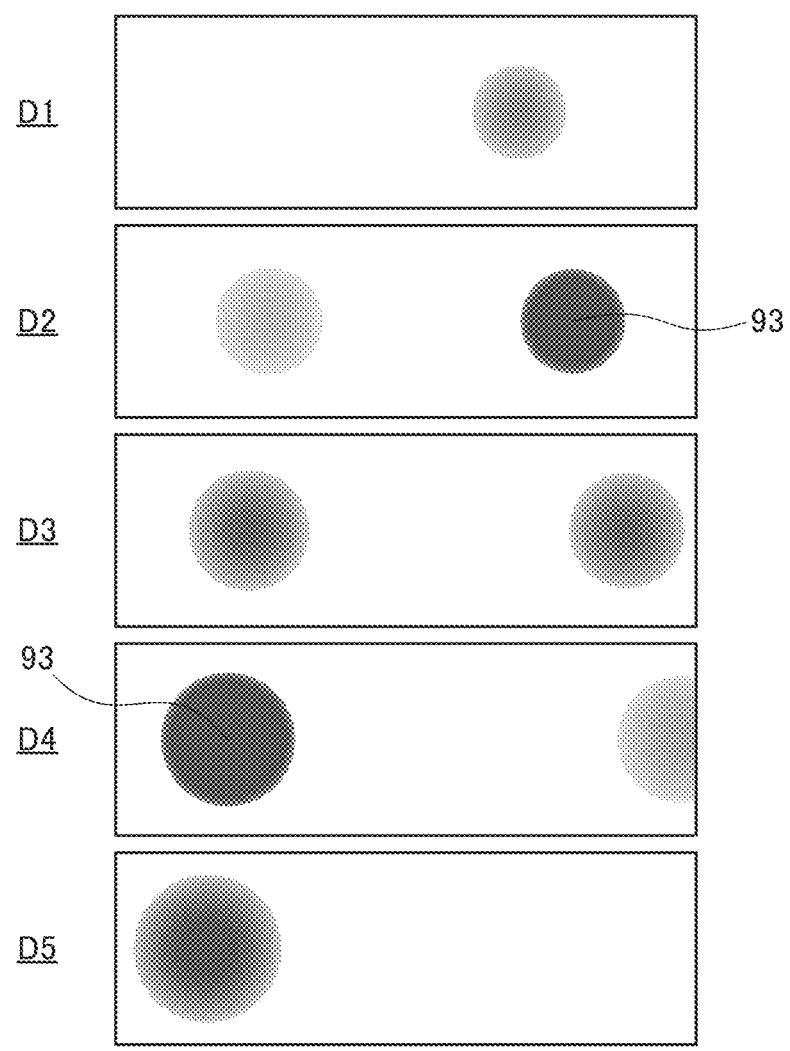
FIG. 18 illustrates five captured images taken at a second image capturing position in FIG. 17.

FIG. 18 illustrates the five captured images D1 to D5 taken from the second image capturing position X2 in FIG. 17. The first to fifth captured images D1 to D5 in FIG. 18 are images captured at the first to fifth focal positions H1 to H5, respectively, in FIG. 17. Each of the captured images D1 to D5 includes one or two images out of two cells 93 held in the well 91. The cell 93 on the right side in the diagram is most sharply in focus in the second captured image D2 taken at the second focal position H2. The cell 93 on the left side in the diagram is most sharply in focus in the fourth captured image D4 taken at the fourth focal position H4.

The observation of the cells 93 is preferably conducted at an in-focus position where the cells are in focus. However, in the case where a plurality of cells 93 included in one well 91 are at different heights (different positions in the direction of the optical axis) as illustrated in FIG. 17, it is not possible to focus on all the cells 93 in one captured image. Thus, the controller 60 of the image capturing device 2 combines luminance values of pixels included in the plurality of captured images D1 to D5 to generate an omnifocal image that focuses on all the cells 93 and has less blurring.

Under the influence of the aforementioned meniscus, the magnifications of the captured images D1 to D5 increase as the height of the focal position decreases. Thus, the first captured image D1 has a lowest magnification and the fifth captured image D5 has a highest magnification among the five captured images D1 to D5. The positions of the cells 93 or the sizes of the cells 93 in each captured image change with the magnification of the captured image. The controller 60 of the image capturing device 2 takes such variations in magnification into consideration when generating an omnifocal image.

Figure 19:
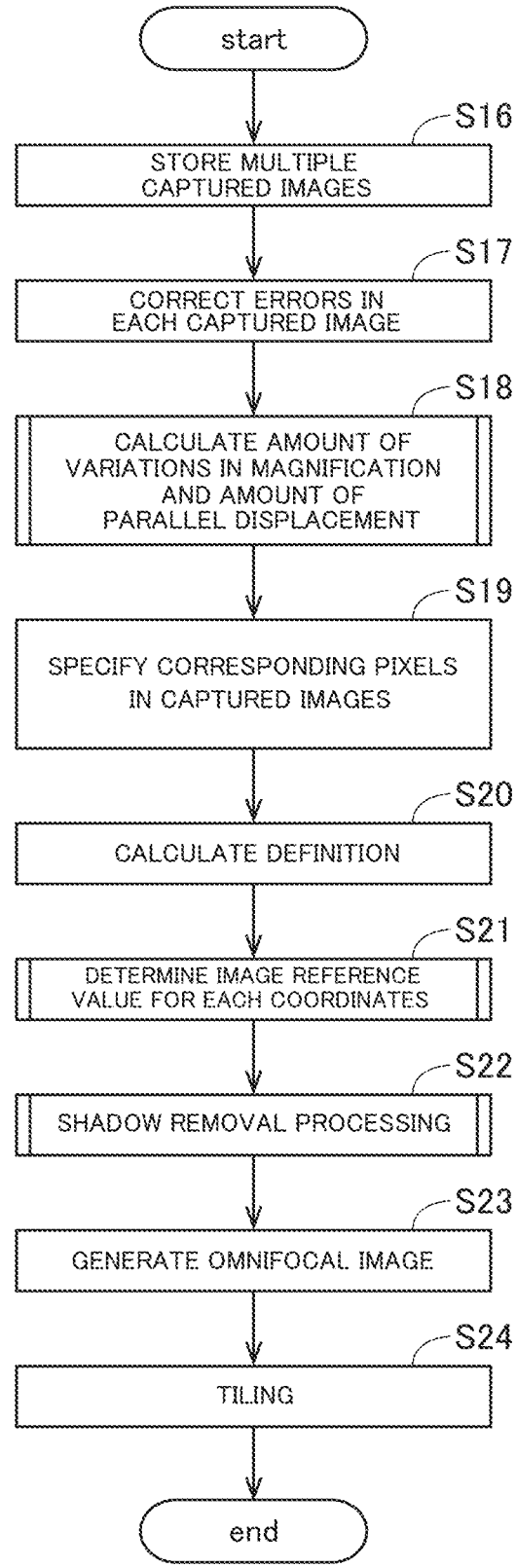
FIG. 19 is a flowchart illustrating a flow of image processing for generating one omnifocal image from the five captured images.

FIG. 19 is a flowchart illustrating a flow of image processing for generating one omnifocal image from the five captured images D1 to D5.

In the case of generating an omnifocal image, the controller 60 first stores the plurality of captured images D1 to D5 obtained by the aforementioned image capturing process in the image storage 621 (step S16). The error corrector 622 of the controller 60 corrects errors in each of the captured images D1 to D5 (step S17). Here, the error corrector 622 corrects variations in position among the captured images D1 to D5, the variations being caused by machine errors in the image capturing device 2. For example, if the camera moving mechanism 50 has a known positioning error, the positions of the captured images D1 to D5 are each corrected by an amount corresponding to the positioning error. This increases the accuracy of calculation of the amounts of variations in magnification and the amounts of parallel displacement among the five captured images D1 to D5 in the next step S18.

Next, the magnification variation acquisition part 623 of the controller 60 calculates the amounts of variations in magnification and the amounts of parallel displacement among the five captured images D1 to D5 (step S18). Here, the magnification variation acquisition part 623 detects how much the sizes of the cells 93 or the positions of the cells 93 change among the five captured images D1 to D5. In this way, the magnitude of variations in magnification caused by the meniscus of the culture solution 92 is calculated.

The example of the processing in step S18 is the same as that in FIG. 9. In step S18, the magnification variation acquisition part 623 executes the processing illustrated in FIG. 9.

Next, the image reference value determination part 624 of the controller 60 specifies corresponding pixels in the five captured images D1 to D5 (step S19). Here, on the basis of the amounts of variations in magnification and the amounts of parallel displacement obtained in step S18, pixels that are determined as being located at the same position in the well 91 in the captured images D1 to D5 are specified as the corresponding pixels.

Then, the image reference value determination part 624 of the controller 60 calculates the definition of each corresponding pixel in the five captured images D1 to D5 (step S20). The definition is an index indicating the sharpness of the image in the vicinity of that pixel. The definition is, for example, calculated on the basis of a change in luminance among pixels in a certain region centered on that pixel. Alternatively, other values such as the value of dispersion of luminance among peripheral pixels, a maximum luminance value, a minimum luminance value, or the luminance value of the pixel of interest itself may be used as the definition.

The image reference value determination part 624 of the controller 60 compares definition among the corresponding pixels in the five captured images D1 to D5. On the basis of the comparison result, an image reference value is determined for each coordinates in the omnifocal image (step S21). The image reference value is a parameter indicating the number of a captured image that is to be referenced as the luminance value of each coordinates in the omnifocal image. For example, in the case where the luminance value of the first captured image D1 is to be referenced for certain coordinates in the omnifocal image, the image reference value is set to 1.

Figure 20:
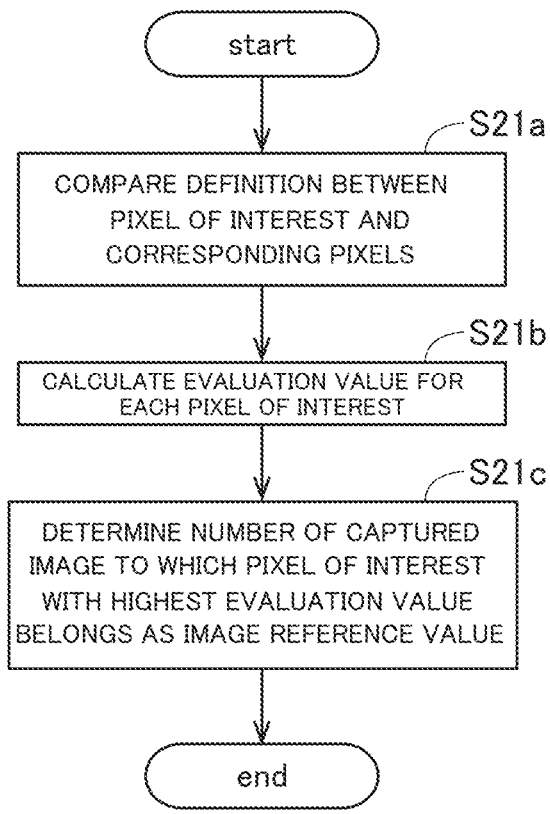
FIG. 20 is a flowchart illustrating an example of processing that is performed in step S21.
Figure 21:
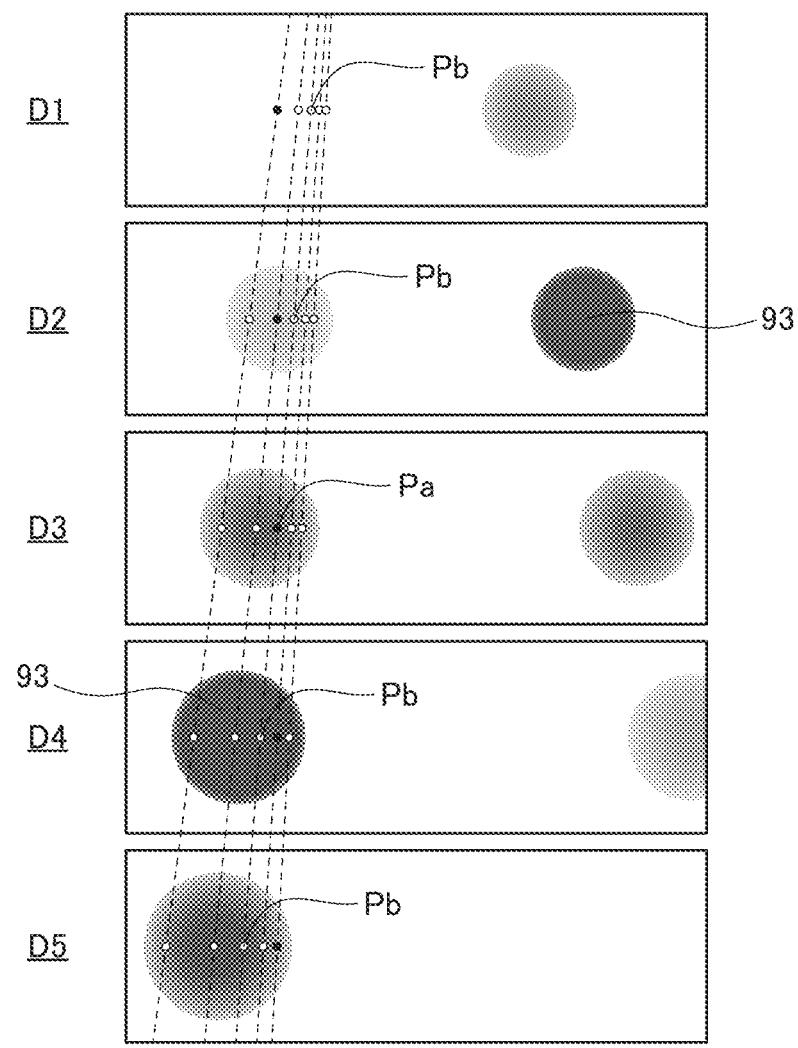
FIG. 21 schematically illustrates processing that is performed in step S21.

FIG. 20 is a flowchart illustrating an example of processing that is performed in step S21. FIG. 21 schematically illustrates the processing performed in step S21. In step S21, definition is first compared between a pixel of interest Pa located at the same coordinates in each of the plurality of captured images and each corresponding pixel Pb in the other captured images that corresponds to the pixel of interest Pa (step S21a). In FIG. 21, the pixels of interest Pa are indicated by closed circles, and the corresponding pixels Pb are indicated by open circles. Each pixel of interest Pa and its corresponding pixels Pb in the other captured images are connected by a broken line in FIG. 21.

According to the present embodiment, the five captured images D1 to D5 are acquired at one image capturing position. Thus, five pixels of interest Pa and 20 corresponding pixels Pb are set for one coordinates as in FIG. 21.

Next, the image reference value determination part 624 calculates an evaluation value for each pixel of interest Pa (i.e., for each group consisting of one pixel of interest Pa and four corresponding pixels Pb), the evaluation value indicating the intensity of the definition of the pixel of interest Pa with respect to the definition of the corresponding pixels Pb (step S21b). The evaluation value may be calculated by, for example, dividing the definition of the pixel of interest Pa by a total value obtained from the definition of the four corresponding pixels Pb. The method of calculating the evaluation value is, however, not limited thereto.

Then, the image reference value determination part 624 determines the number of a captured image to which, among the pixels of interest Pa in the five captured images D1 to D5, the pixel of interest Pa having a highest evaluation value belongs, as an image reference value (step S21c). For example, in the case where the pixel of interest Pa that is set in the fourth captured image D4 has a highest evaluation value among the five pixels of interest Pa illustrated in FIG. 21, the image reference value of this coordinates is set to 4. In this way, the image reference value of one coordinates is determined. The image reference value determination part 624 executes the aforementioned processing in steps S21a to S21c for each coordinates. As a result, the image reference value indicating a captured image that is to be referenced is determined for each coordinates in the omnifocal image DA.

The above-described image processing, however, involves the calculation of coordinates based on the amounts of variations in magnification. Thus, pixels in blurred portions are often selected when determining the image reference values in step S21. If such pixels are selected, for example, a shadow-like region will appear around a focused cell 93 in the omnifocal image DA that is to be generated in step S23 described later.

Figure 22:
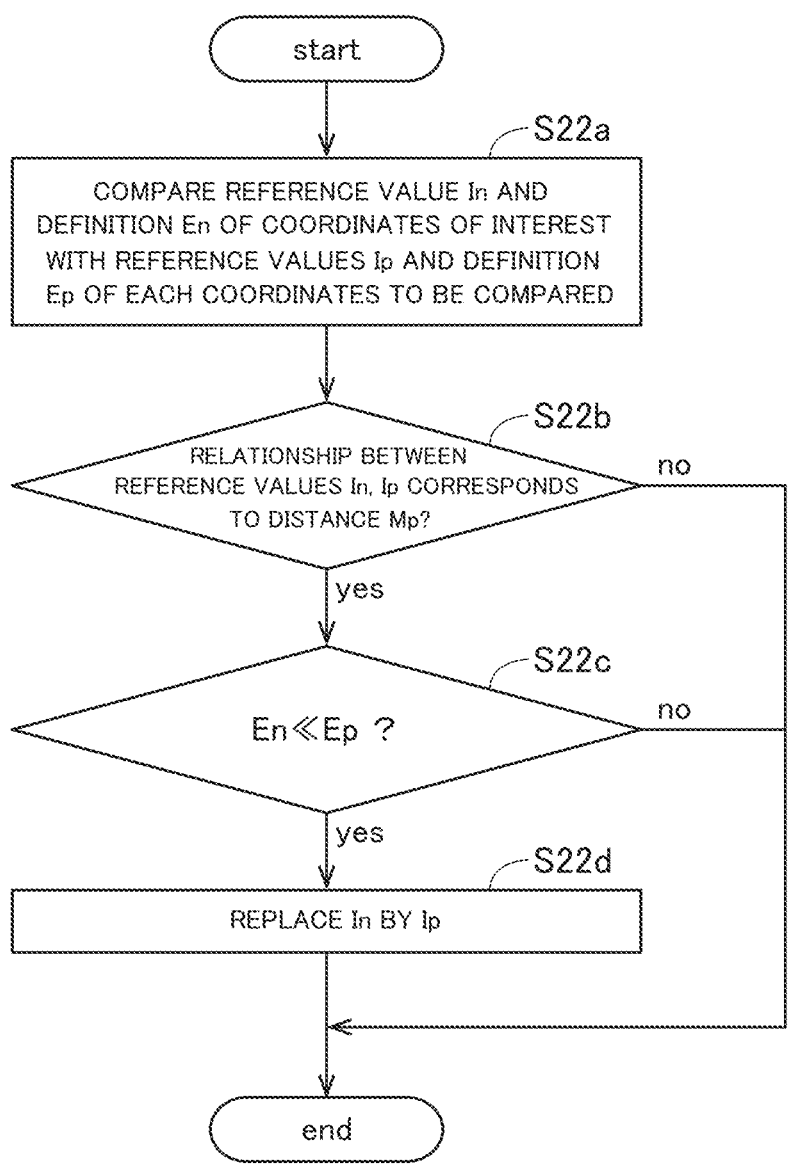
FIG. 22 is a flowchart illustrating an example of shadow removal processing.
Figure 23:
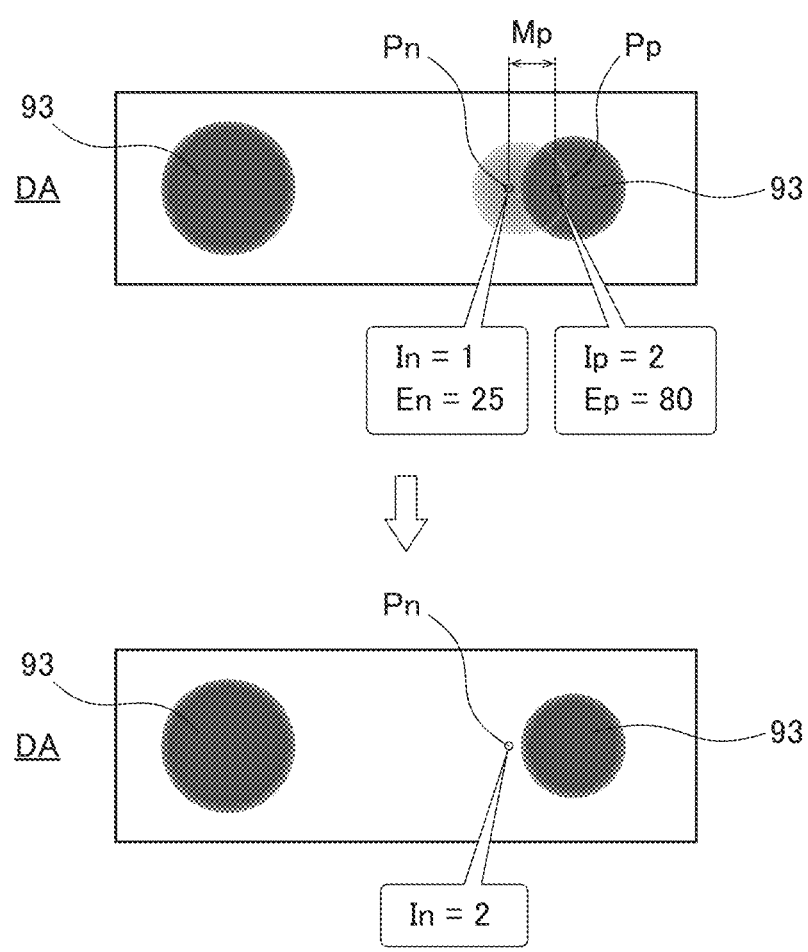
FIG. 23 schematically illustrates the shadow removal processing.

In order to solve this problem, the shadow removal processing part 625 of the controller 60 performs shadow removal processing for adjusting the image reference values that have been once determined (step S22). FIG. 22 is a flowchart illustrating an example of the shadow removal processing. FIG. 23 schematically illustrates the shadow removal processing. The upper section of FIG. 23 shows an example of the omnifocal image DA generated without executing the shadow removal processing. In this omnifocal image DA, the image of an unfocused cell 93 in the first captured image D1 that intrinsically should not be selected appears in the vicinity of the cell 93 on the right side.

As illustrated in FIG. 22, the shadow removal processing part 625 first compares, for each coordinates, an image reference value In and definition En of the coordinates itself with an image reference value Ip and definition Ep of each of another coordinates and peripheral coordinates thereof, the other coordinates being separated from the coordinates by a distance corresponding to variations in magnification in the direction of the variations in magnification (step S12a). The upper section of FIG. 23 shows that the image reference value In of the coordinates of interest Pn is 1, and the definition En thereof is 25. In contrast, the image reference value Ip of coordinates Pp to be compared is 2 and the definition Ep thereof is 80.

The shadow removal processing part 625 first determines whether or not the relationship between the image reference value In of the coordinates of interest Pn itself and the image reference value Ip of the coordinates Pp to be compared corresponds to a distance Mp between these two coordinates (step S22b). Specifically, the shadow removal processing part 625 determines whether or not the amount of variations in magnification between the captured images that are referenced by the image reference values In and Ip corresponds to the distance Mp between the two coordinates. If it is determined that they do not correspond, then the image reference value In of the coordinates of interest Pn is retained without alteration.

On the other hand, if it is determined in step S22b that the relationship between the image reference values In and Ip corresponds to the distance Mp between the two coordinates, then the shadow removal processing part 625 determines whether or not the definition Ep of each coordinates to be compared, i.e., the coordinates Pp and the peripheral coordinates thereof, is sufficiently greater than the definition En of the coordinates of interest Pn itself (step S22c). Specifically, the shadow removal processing part 625 determines whether or not the definition Ep of each coordinates to be compared, i.e., the coordinates Pp and the peripheral coordinates thereof, is greater by a preset threshold value or more than the definition En of the coordinates of interest itself. If it is determined that the definition Ep is not sufficiently greater than the definition En, then the image reference value In of the coordinates of interest Pn is retained without alteration.

On the other hand, if it is determined in step S22d that the definition Ep of each coordinates to be compared, i.e., the coordinates Pp and the peripheral coordinates thereof, is sufficiently greater than the definition En of the coordinates of interest Pn itself, then the image reference value In of the coordinates of interest Pn is replaced by the image reference value Ip of the coordinates Pp to be compared (step S22d). In the example in FIG. 23, the image reference value In of the coordinates of interest Pn is rewritten from 1 to 2. In this case, even if a blurred portion of a cell 93 is adopted in the omnifocal image DA as illustrated in the upper section of FIG. 23, it is possible to replace that blurred portion by the luminance value of the captured image taken at the in-focus position (second captured image D2 in the example in FIG. 23). By performing such processing for each coordinates, it is possible to remove shadows that may appear in the omnifocal image DA as illustrated in the lower section of FIG. 23.

Note that the shadow removal processing in step S22 may be executed after the generation of the omnifocal image in step S23.

Refer back to FIG. 19. When the image reference value of each coordinates has been determined, then the omnifocal image generator 626 of the controller 60 generates an omnifocal image (step S23). Here, the luminance value of each coordinates in the omnifocal image is determined by referencing the luminance values in the captured images indicated by the image reference values determined in steps S21 and S22. The luminance value of each coordinates in the omnifocal image may be the luminance value of the pixel of interest Pa itself in the captured image indicated by the image reference value, or may be a different value calculated on the basis of the luminance value of the pixel of interest Pa.

Figure 24:
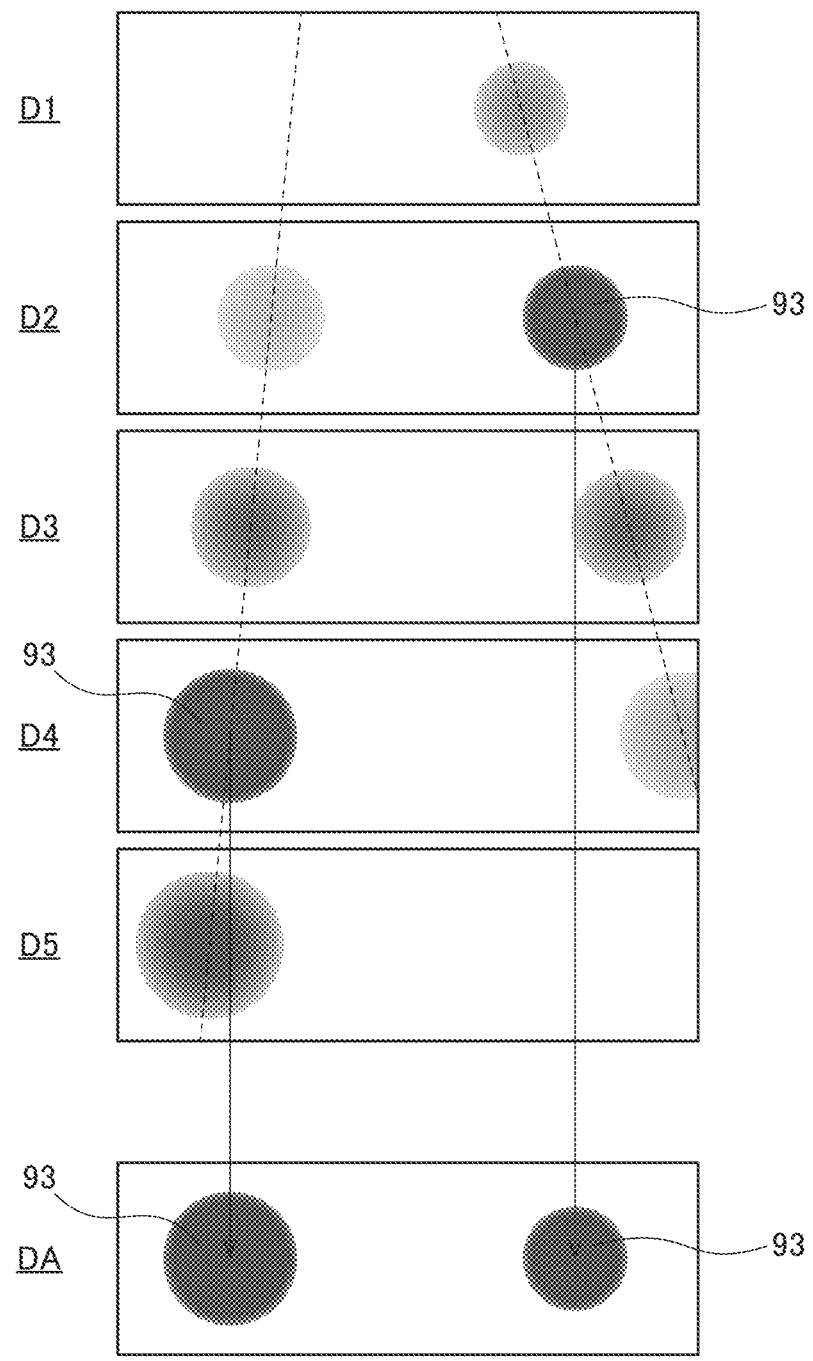
FIG. 24 schematically illustrates the relationship between the five captured images and the generated omnifocal image.

FIG. 24 schematically illustrates the relationship between the five captured images D1 to D5 and the generated omnifocal image DA. As illustrated in FIG. 24, with the technique according to the present embodiment, corresponding pixels (e.g., pixels connected by broken lines in FIG. 24)

in the plurality of captured images are specified in consideration of variations in magnification. Then, the image reference value of each coordinates in the omnifocal image DA is determined by comparing definition among the corresponding pixels. Thereafter, the luminance value of the captured image indicated by the image reference value is referenced for each coordinates to generate an omnifocal image. With this technique, it is possible to generate the omnifocal image DA even if the plurality of captured images varies in magnification. It is also possible to generate the omnifocal image DA that reflects the positions and sizes of the cells 93 with high accuracy, because the captured images are neither enlarged nor reduced.

Refer back to FIG. 19. The tiling processing part 627 of the controller 60 arranges (tiles) a plurality of omnifocal images DA acquired with different fields of view by image captures from different image capturing positions. Accordingly, one resultant image representing the entire well 91 is generated (step S24). As described above, the image processing according to the present embodiment enables generating the omnifocal image DA that reflects the positions and sizes of the cells 93 with high accuracy. Thus, the positions and sizes of the cells 93 match with high accuracy between adjacent omnifocal images DA at the time of tiling. This suppresses an image disturbance at the boundaries of the omnifocal images DA in the resultant image.

3. Variations

While embodiments of the present invention have been described thus far, the present invention is not limited to the above-described embodiments.

If the center position of variations in magnification among the captured images is almost fixed, the reciprocal correction of the amounts of parallel displacement may be omitted from the aforementioned step S8 or S18. However, if the center position of variations in magnification is liable to change in Embodiment 1, it is desirable to reciprocally correct both of the amount of variations in magnification and the amount of parallel displacement for each captured image as in the above-described embodiments. This allows the positions of the cells 93 in the captured images D1 to D5 to match with high accuracy. Also, if the center position of variations in magnification is liable to change in Embodiment 2, it is desirable to calculate both of the amounts of variations in magnification and the amounts of parallel displacement and specify corresponding pixels in the captured images on the basis of the amounts of variations in magnification and the amounts of parallel displacement in step S19 as in the above-described embodiment. This increases the accuracy of specifying corresponding pixels in the captured images.

According to the above-described embodiments, the amount of variations in magnification and the amount of parallel displacement are obtained for each pair of adjacent images when the five captured images D1 to D5 are arranged in order of the focal position. Alternatively, the amount of variations in magnification and the amount of parallel displacement may be obtained for each pair of images that are spaced from each other. However, cells 93 in each captured image change only by a small amount between two adjacent images. Thus, the same cells 93 can more easily be associated with each other between those two captured images. Accordingly, the amount of variations in magnification and the amount of parallel displacement can be obtained with higher accuracy by the template matching in step S72.

According to the above-described embodiments, the values of the magnification and the amount of parallel displacement of the selected image are directly determined as the amount of variations in magnification and the amount of parallel displacement between two images in step S75. Alternatively, the amount of variations in magnification and the amount of parallel displacement may be calculated with higher accuracy by approximation of functions such as parabolic fitting.

According to the above-described embodiments, the captured image D1 having a lowest magnification is used as a reference when reducing the other captured images D2 to D5 in step S8 or S9. This eliminates the need for interpolation processing because the resolutions of the captured images D2 to D5 do not decrease. Alternatively, any one of the captured images D2 to D5 may be used as a reference image when enlarging or reducing the other images in step S8.

Also, the captured images D1 to D5 may be reduced prior to the above-described processing in step S7 or S18 in order to reduce computational loads on the controller 60.

According to the above-described embodiments, the amounts of variations in magnification among a plurality of captured images are calculated after the captured images are acquired. However, in the case where the amount of variations in magnification does not change, such as where the captured images vary in magnification due to the characteristics of the optical system, the amounts of variations in magnification may be stored in advance in the controller 60.

According to the above-described embodiments, the cells 93 to be observed are held in the plurality of wells 91 of the well plate 9. Alternatively, the cells 93 may be held in a container other than the well plate 9. For example, the cells 93 may be held in a petri dish. However, in the case where the well plate 9 is used as in the above-described embodiments, the individual wells 91 holding the cells 93 are relatively small. This makes the meniscus of the culture solution 92 more likely affect the captured images. Therefore, the present invention is particularly useful.

According to the above-described embodiments, the cells 93 are held along with the culture solution 92 in the well plate 9. Alternatively, the cells 93 may be held along with a gel culture medium. The gel culture medium also has an irregular surface shape. Thus, the captured images vary in magnification depending on the shooting distance under the influence of the surface shape of the culture medium. Thus, it is not possible to obtain a fine omnifocal image by simply combining the captured images. However, if the amounts of variations in magnification and the amounts of parallel displacement are obtained and reciprocally corrected as in the above-described embodiments, it is possible to align the positions of the cells 93 in each captured image. Accordingly, an omnifocal image with less blurring can be generated.

According to the above-described embodiments, the cells 93 that are simple substances are used as objects targeted for image capture. Alternatively, the objects targeted for image capture may be cell agglomerations (spheroids) that are three-dimensional aggregates of a plurality of cells. As another alterative, the objects targeted for image capture may be substances other than cells, which are held along with a liquid or gel substance in the container.

According to the above-described embodiments, the projector 20 is disposed above objects targeted for image capture, and the camera 40 is disposed below the objects targeted for image capture. Alternatively, the projector 20 may be disposed under the objects targeted for image capture, and the camera 40 may be disposed above the objects targeted for image capture. As another alternative, a configuration is also possible in which the projector 20 and the camera 40 are disposed on the same side relative to the objects targeted for image capture, and reflected light of the light emitted from the projector 20 is incident on the camera 40.

According to Embodiment 1 described above, the focal position of the camera 40 is changed along the optical axis by moving the camera 40 itself up and down. Alternatively, the position of the camera 40 may be fixed, and the optical system such as a lens may be moved to change the focal position of the camera 40 along the optical axis. According to Embodiment 2 described above, the focal position of the camera 40 is changed by moving some optics included in the optical system 41 of the camera 40. Alternatively, the entire camera 40 may be moved up and down to change the focal position of the camera 40 within the well 91 along the optical axis.

Also, the focal position of the camera 40 relative to the container may be changed by moving the container holding the objects targeted for image capture up and down. That is, the "moving mechanism" according to the present invention may be any of the mechanism for moving some optics in the camera 40, the mechanism for moving the entire camera 40, and the mechanism for moving the container.

According to the above-described embodiments, the position of the container holding the objects targeted for image capture is fixed, and the projector 20 and the camera 40 are moved in the horizontal direction. Alternatively, the positions of the projector 20 and the camera 40 may be fixed, and the container may be moved in the horizontal direction. However, if the surface shape of the culture solution 92 changes during image capture, it is difficult to accurately calculate the amounts of variations in magnification and the amounts of parallel displacement among the captured images. Therefore, it is preferable for the positions of objects targeted for image capture to be fixed as in the above-described embodiments.

According to Embodiment 1 described above, the height of the camera 40 can be changed in five stages, and five captured images are acquired for each well 91. Alternatively, the number of images to be captured for each well 91 may be in the range of two to four, or may be six or more. According to Embodiment 2 described above, the focal position of the camera 40 can be changed in five stages, and five captured images D1 to D5 are acquired for each field of view. Alternatively, the number of images to be captured for each field of view may be in the range of two to four, or may be six or more.

Each element in the above-described embodiments and variations may be combined appropriately within a range that presents no contradictions.

REFERENCE SIGNS LIST 1, 2 Image capturing device
9 Well plate
10 Stage
20 Projector
30 Projector moving mechanism
40 Camera
50 Camera moving mechanism
51 Up-and-down movement mechanism
52 Horizontal movement mechanism
60 Controller
91 Well
92 Culture solution
93 Cell
621 Image storage
622 Error corrector
623 Magnification variation acquisition part
624 Image reference value determination part
625 Shadow removal processing part
626 Omnifocal image generator
627 Tiling processing part
P1 Control program
P2 Image processing program
L Light
D1, D2, D3, D4, D5 Captured image
D31, D32, D33 Candidate image
DA Omnifocal image
S Maximum value of matching score
M Amount of parallel displacement

The invention claimed is:

1. An image processing method for generating an omnifocal image on the basis of a plurality of captured images, the method comprising the steps of:
    a) acquiring a plurality of captured images by capturing an image of an object while changing a focal position along an optical axis;
    b) acquiring variations in magnification among said plurality of captured images;
    c) specifying corresponding pixels in said plurality of captured images and comparing definition among said corresponding pixels on the basis of said variations in magnification;
    d) determining an image reference value on the basis of a comparison result obtained in said step c), the image reference value being a number of one of said captured images that is to be referenced as a luminance value of each coordinates in an omnifocal image; and
    e) generating an omnifocal image by referencing the luminance value in the captured image indicated by said image reference value for each coordinates,
    wherein said step c) includes the steps of:
    c1) comparing definition between pixels of interest located at the same coordinates in said plurality of captured images and corresponding pixels that correspond to said pixels of interest in other captured images; and
    c2) calculating an evaluation value for each of said pixels of interest, the evaluation value indicating intensity of definition of each of said pixels of interest with respect to definition of said corresponding pixels, and
    in said step d), the number of a captured image to which, among said pixels of interest in said plurality of captured images, a pixel of interest having a highest evaluation value belongs is determined as said image reference value.

2. The image processing method according to claim 1, wherein in said step b), an amount of variations in magnification and an amount of parallel displacement are acquired among said plurality of captured images; and
    in said step c), corresponding pixels in said plurality of captured images are specified on the basis of said amount of variations in magnification and said amount of parallel displacement.

3. The image processing method according to claim 1, further comprising the step of:
    g) generating one resultant image by arranging a plurality of said omnifocal images obtained with different fields of view.

4. The image processing method according to claim 1, wherein said object is held along with a liquid or gel substance in a container.

5. The image processing method according to claim 4, wherein
said object is a biological cell held along with a culture solution or a gel culture medium in said container.

6. An image processor for generating an omnifocal image on the basis of a plurality of captured images, comprising:
an image storage that stores a plurality of captured images by capturing an image of an object while changing a focal position along an optical axis;
a magnification variation acquisition part that acquires variations in magnification among said plurality of captured images;
an image reference value determination part that specifies corresponding pixels in said plurality of captured images and compares definition among said corresponding pixels on the basis of said variations in magnification to determine an image reference value that is a number of one of said captured images that is to be referenced as a luminance value of each coordinates in an omnifocal image; and
an omnifocal image generator that generates an omnifocal image by referencing the luminance value in the captured image indicated by said image reference value for each coordinates,
wherein said image reference value determination part executes processing of:
1) comparing definition between pixels of interest located at the same coordinates in said plurality of captured images and corresponding pixels that correspond to said pixels of interest in other captured images;
2) calculating an evaluation value for each of said pixels of interest, the evaluation value indicating intensity of definition of each of said pixels of interest with respect to definition of said corresponding pixels; and
3) determining the number of a captured image to which, among said pixels of interest in said plurality of captured images, a pixel of interest having a highest evaluation value belongs, as said image reference value.

7. The image processor according to claim 6, wherein
said magnification variation acquisition part acquires an amount of variations in magnification and an amount of parallel displacement among said plurality of captured images, and
said image reference value determination part specifies corresponding pixels in said plurality of captured images on the basis of said amount of variations in magnification and said amount of parallel displacement.

8. The image processor according to claim 6, further comprising:
a tiling processing part that generates one resultant image by arranging a plurality of said omnifocal images obtained with different fields of view.

9. The image processor according to claim 6, wherein
said object is held along with a liquid or gel substance in a container.

10. The image processor according to claim 9, wherein
said object is a biological cell held along with a culture solution or a gel culture medium in said container.

11. An image capturing device comprising:
the image processor according to claim 6;
a camera that captures an image of said object;
a projector that emits light toward said object; and
a moving mechanism that changes a focal position of said camera along an optical axis.

12. An image capturing device for capturing an image of an object to generate an omnifocal image, comprising:
a camera that captures an image of said object;
a projector that emits light toward said object;
a moving mechanism that changes a focal position of said camera along an optical axis; and
a controller that controls said camera, said projector, and said moving mechanism and processes an image acquired by said camera,
wherein said controller executes the steps of:
a) acquiring a plurality of captured images by causing said camera to capture an image while causing said moving mechanism to change said focal position;
b) calculating variations in magnification among said plurality of captured images;
c) performing reciprocal correction of said variations in magnification for each of said plurality of captured images; and
d) generating an omnifocal image by using said plurality of captured images having undergone said reciprocal correction,
wherein in said step c), one of said captured images that has a lowest magnification is used as a reference when reducing the others of said captured images.

13. The image capturing device according to claim 12, wherein
in said step b), an amount of variations in magnification and an amount of parallel displacement are acquired for each pair of images among said plurality of captured images.

14. The image capturing device according to claim 13, wherein
said step b) includes the steps of:
b-1) creating a plurality of candidate images by enlarging or reducing one of said pair of images to each preset magnification;
b-2) displacing said candidate images parallel and relative to the other of said pair of images to obtain, for each of said candidate images, an amount of parallel displacement that has a maximum value of a matching score;
b-3) determining one of said candidate images that has a highest value for said maximum value of said matching score, as a selected image; and
b-4) determining a magnification of said selected image as an amount of variations in magnification between said pair of images and determining said amount of parallel displacement of said selected image as an amount of parallel displacement between said pair of images.

15. The image capturing device according to claim 13, wherein
said pair of images is a pair of adjacent images when said plurality of captured images are arranged in order of said focal position.

16. The image capturing device according to claim 12, wherein
said controller further executes the step of, after said step a) and before said step b), correcting variations in position among said captured images, the variations being caused by a machine error in said image capturing device.

17. The image capturing device according to claim 12, wherein
said moving mechanism moves said camera relative to said object that is at a standstill.

18. The image capturing device according to claim 12, further comprising:
a stage that holds a container,
wherein said object is held along with a liquid or gel substance in said container.

19. The image capturing device according to claim 18, wherein
said container is a well plate.

20. The image capturing device according to claim 18, wherein
said object is a biological cell held along with a culture solution or a gel culture medium in said container.

21. An image capturing method for capturing an image of an object to generate an omnifocal image, the method comprising the steps of:
a) acquiring a plurality of captured images by capturing an image of said object with a camera while changing a focal position of said camera along an optical axis;
b) calculating variations in magnification among said plurality of captured images;
c) performing reciprocal correction of said variations in magnification for each of said plurality of captured images; and
d) generating an omnifocal image by using said plurality of captured images having undergone said reciprocal correction,
wherein in said step c), one of said captured images that has a lowest magnification is used as a reference when reducing the others of said captured images.

22. The image capturing method according to claim 21, wherein
in said step b), an amount of variations in magnification and an amount of parallel displacement are acquired for each pair of images among said plurality of captured images.

23. The image capturing method according to claim 22, wherein
said step b) includes the steps of:
b-1) creating a plurality of candidate images by enlarging or reducing one of said pair of images to each preset magnification;
b-2) displacing said candidate images parallel and relative to the other of said pair of images to obtain, for each of said candidate images, an amount of parallel displacement that has a maximum value of a matching score;
b-3) determining one of said candidate images that has a highest value for said maximum value of said matching score, as a selected image; and
b-4) determining a magnification of said selected image as an amount of variations in magnification between said pair of images and determining said amount of parallel displacement of said selected image as an amount of parallel displacement between said pair of images.

24. The image capturing method according to claim 22, wherein
said pair of images is a pair of adjacent images when said plurality of captured images are arranged in order of said focal position.

25. The image capturing method according to claim 21, further comprising the step of:
after said step a) and before said step b), correcting variations in position among said captured images, the variations being caused by a machine error in said image capturing device.

26. The image capturing method according to claim 21, wherein
in said step a), said camera is moved relative to said object that is at a standstill.

27. The image capturing method according to claim 21, wherein
said object is held along with a liquid or gel substance in a container.

28. The image capturing method according to claim 27, wherein
said container is a well plate.

29. The image capturing method according to claim 27, wherein
said object is a biological cell held along with a culture solution or a gel culture medium in said container.

30. An image processing method for generating an omnifocal image on the basis of a
plurality of captured images, the method comprising the steps of:
a) acquiring a plurality of captured images by capturing an image of an object while changing a focal position along an optical axis;
b) acquiring variations in magnification among said plurality of captured images;
c) specifying corresponding pixels in said plurality of captured images and comparing definition among said corresponding pixels on the basis of said variations in magnification;
d) determining an image reference value on the basis of a comparison result obtained in said step c), the image reference value being a number of one of said captured images that is to be referenced as a luminance value of each coordinates in an omnifocal image; and
e) generating an omnifocal image by referencing the luminance value in the captured image indicated by said image reference value for each coordinates,
wherein the image processing method further comprises the step of:
f) for each coordinates, comparing the definition and image reference value of said coordinates itself with the definition and image reference value of each of another coordinates and peripheral coordinates thereof, said another coordinates being separated from said coordinates by a distance corresponding to variations in magnification in a direction of said variations in magnification, and in a case where the definition of each of said another coordinates and the peripheral coordinates thereof is sufficiently greater than the definition of said coordinates itself and a relationship between the image reference value of said coordinates itself and the image reference value of said another coordinates corresponds to said distance, replacing the image reference value of said coordinates by the image reference value of said another coordinates,
said step f) being performed after said step d).

31. An image processor for generating an omnifocal image on the basis of a plurality of captured images, comprising:
an image storage that stores a plurality of captured images by capturing an image of an object while changing a focal position along an optical axis;
a magnification variation acquisition part that acquires variations in magnification among said plurality of captured images;
an image reference value determination part that specifies corresponding pixels in said plurality of captured images and compares definition among said corresponding pixels on the basis of said variations in magnification to determine an image reference value that is a number of one of
said captured images that is to be referenced as a luminance value of each coordinates in an omnifocal image; and
an omnifocal image generator that generates an omnifocal image by referencing the luminance value in the captured image indicated by said image reference value for each coordinates,
wherein the image processor further comprises:
a shadow removal processing part that, for each coordinates, compares the definition and image reference value of said coordinates itself with the definition and image reference value of each of another coordinates and peripheral coordinates thereof, said another coordinates being separated from said coordinates by a distance corresponding to variations in magnification in a direction of said variations in magnification, and in a case where the definition of each of said another coordinates and the peripheral coordinates thereof is sufficiently greater than the definition of said coordinates itself and a relationship between the image reference value of said coordinates itself and the image reference value of said another coordinates corresponds to said distance, replaces the image reference value of said coordinates by the image reference value of said another coordinates.

* * * * *